(12) United States Patent
Oogami et al.

(10) Patent No.: US 7,291,422 B2
(45) Date of Patent: Nov. 6, 2007

(54) BATTERY AND RELATED METHOD

(75) Inventors: Etsuo Oogami, Atsugi (JP); Ryuichi Amagai, Isehara (JP); Tadahiko Morigaki, Zama (JP); Tsuyoshi Enokida, Yamato (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 10/959,301

(22) Filed: Oct. 7, 2004

(65) Prior Publication Data
US 2005/0123828 A1 Jun. 9, 2005

(30) Foreign Application Priority Data

Oct. 10, 2003 (JP) ............................. 2003-351733
Oct. 10, 2003 (JP) ............................. 2003-351739

(51) Int. Cl.
*H01M 6/46* (2006.01)
*H01M 2/24* (2006.01)

(52) U.S. Cl. .................... 429/152; 429/157; 429/158; 429/160

(58) Field of Classification Search ................ 429/152, 429/157, 158, 160
See application file for complete search history.

(56) References Cited

U.S. PATENT DOCUMENTS

| 3,923,549 A | 12/1975 | Mabuchi et al. |
| 6,120,935 A * | 9/2000 | Van Lerberghe ............ 429/211 |
| 2003/0211393 A1* | 11/2003 | Yamamoto et al. ......... 429/223 |

FOREIGN PATENT DOCUMENTS

| DE | 195 38 003 A1 | 4/1996 |
| JP | 10-255734 A | 9/1998 |
| JP | 2000-195480 A | 7/2000 |
| JP | 2001-229897 | * 8/2001 |
| JP | 2004-031122 | * 1/2004 |

* cited by examiner

*Primary Examiner*—Raymond Alejandro
(74) *Attorney, Agent, or Firm*—Foley & Lardner LLP

(57) ABSTRACT

A battery is provided with a plurality of unit cells stacked in a stack direction, a plurality of conductive members each having an electric conductivity, and a plurality of insulation members each having an insulation property. The plurality of conductive members and the plurality of insulation members are alternately disposed in the stack direction with the plurality of unit cells having respective output terminals being sandwiched such that the plurality of unit cells are electrically connected in the stack direction.

27 Claims, 23 Drawing Sheets

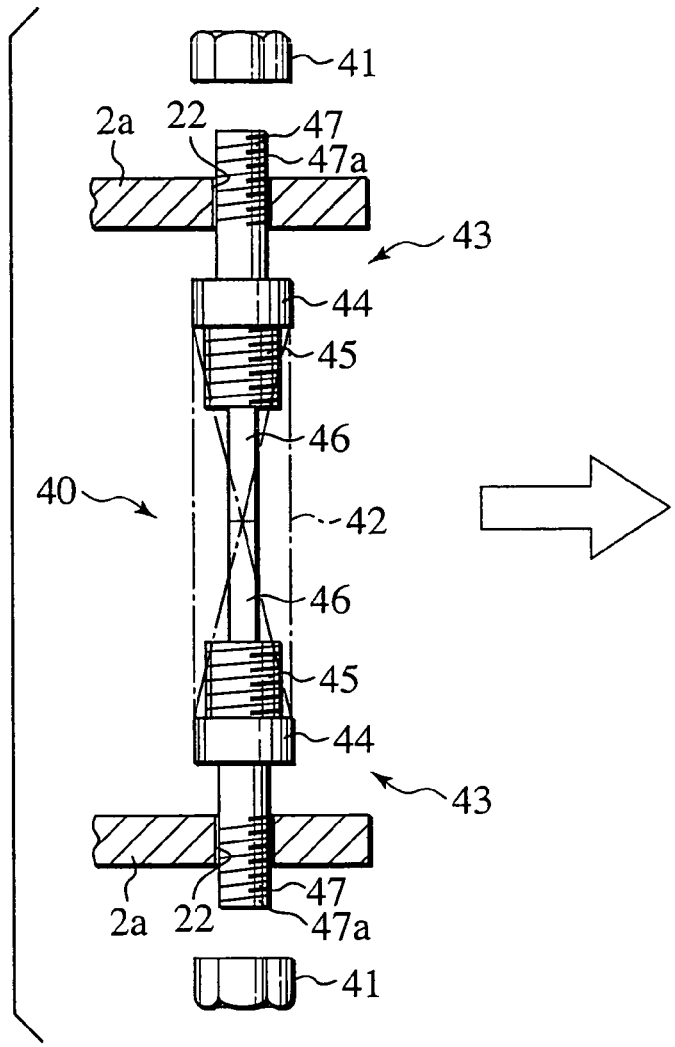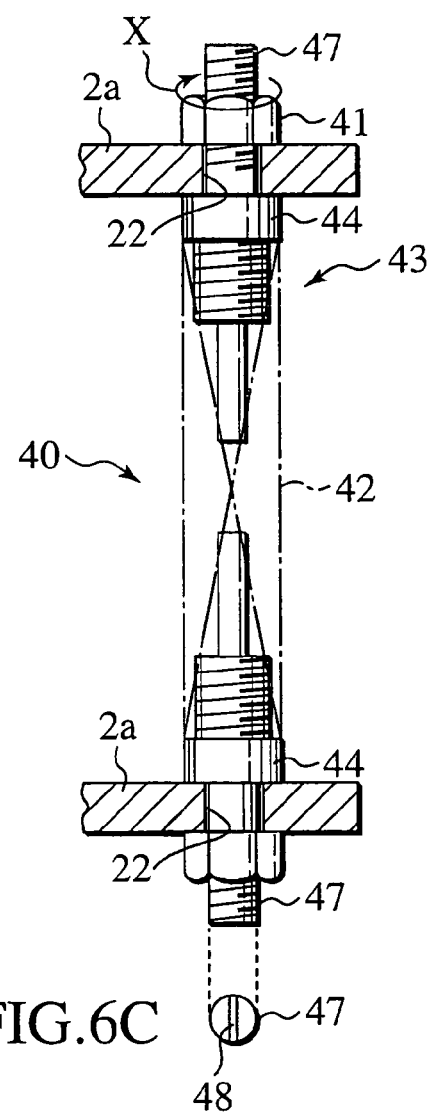
FIG.6A FIG.6B FIG.6C

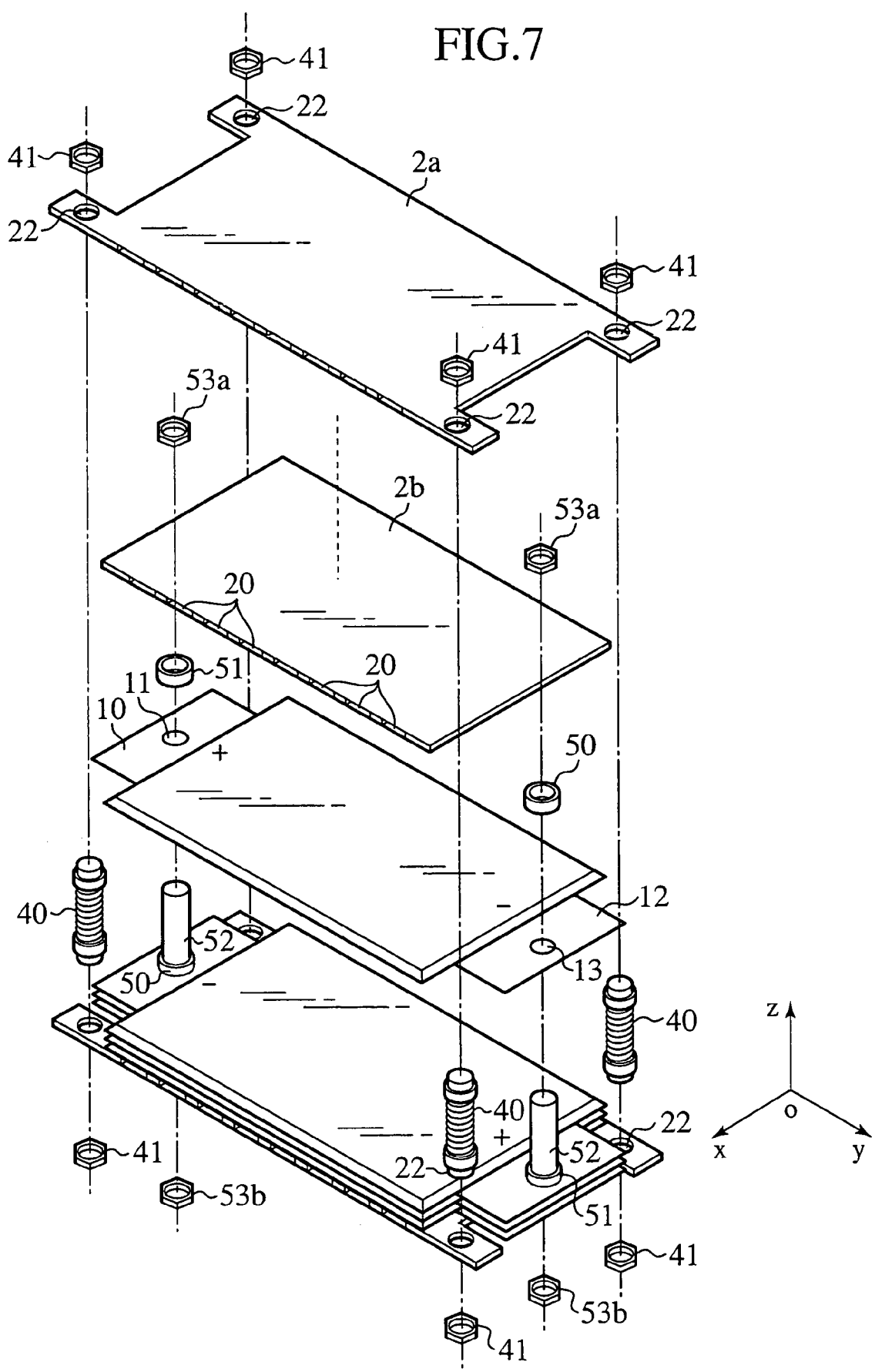

FIG.22B  FIG.22A
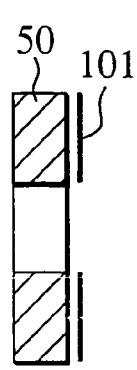 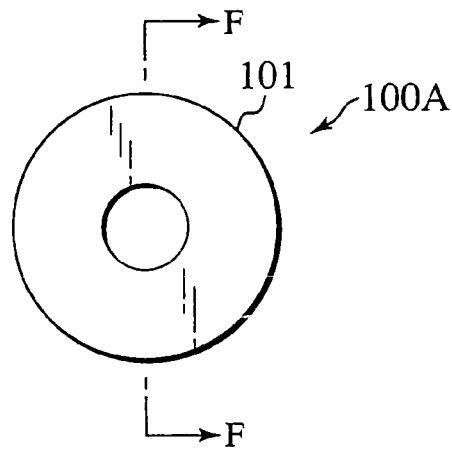
FIG.22D  FIG.22C
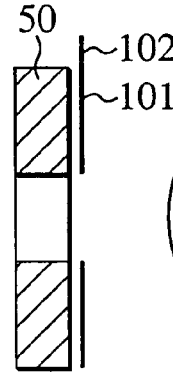 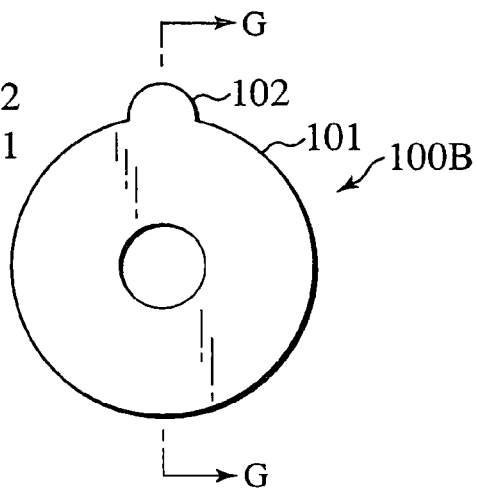
FIG.22F  FIG.22E
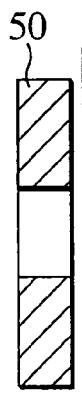 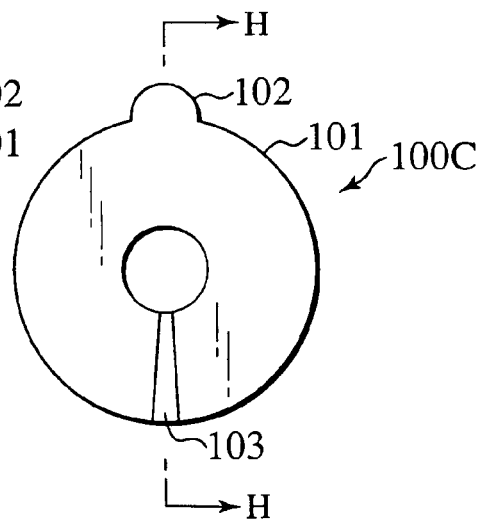

BATTERY AND RELATED METHOD

BACKGROUND OF THE INVENTION

This invention relates to a battery and a related method and, more particularly, a battery, which has a high energy density and is small in size and lightweight in structure to be available as an electric power source to supply large energy, and its related method.

In recent years, with an increasing concern for environmental consciousness, there have been significant movements in shift of power sources of automotive vehicles from engines utilizing fossil fuel to motors utilizing electric energy. For this reason, there have been rapid developments in technologies of batteries playing roles as the power sources of the motors.

The automotive vehicles are expected to be installed with the batteries, which are small in size, lightweight in structure with a capability of charging and discharging large electric power at frequent cycles, and excellent vibration-proof property and heat radiation characteristic.

Japanese Patent Application Laid-Open Publication No. 2000-195480 (see paragraph numbers 0014 to 0029 and FIGS. 1, 2 and 4) discloses a battery. In particular, the battery has a structure that includes a plurality of flat-shaped unit cells, electrically connected in series, parallel and series and parallel, which are disposed in a thickness direction of the unit cells at given intervals, and pressurizing members located between the unit cells of a stack to pressurize the unit cells on both sides of the stack whereupon the plurality of unit cells are fastened by an outer sheath member. With such a structure, attempts have been made to cause the unit cells to have favorable heat radiating characteristics to provide a battery with improved cyclic characteristic and rate characteristic.

SUMMARY OF THE INVENTION

Upon studies conducted by the present inventors, since such a battery is comprised of flat-shaped cells as unit cells, the battery has a larger energy density than that of a battery formed of cells other than the flat-shaped cells and can be formed in miniaturization provided the cells with identical electric power capacity. For this reason, the battery formed of the flat-shaped cells is suited as a battery for installation on an automotive vehicle in view of a miniaturized structure with high energy density.

However, according to further extensive analysis conducted by the present inventors, since the battery includes a battery developed for use in an electric power storage system, it is considered that there exists a room required for conducting further study on such structure for the purpose of applying the battery to the automotive vehicle that requires a production efficiency, a small size with lightweight, anti-vibration capability and high reliability.

In particular, a need arises for realizing a battery with a structure that satisfies various requirements: such as a structure enabled to provide a high production efficiency and wherein unit cells are comprised of small number of component parts as less as possible to provide a miniaturization in lightweight to provide the maximum volumetric efficiency, a structure wherein the battery is able to prevent the occurrence of deterioration in capacity and drop in battery life as a result of gas generated inside the battery even in the presence of charging and discharging at frequently repeated cycles, a structure that has anti-vibration capability to be stably operative even in the exposure to vibrations at all times, and a structure enabled to efficiently radiate heat even in the unit cells being arranged in high density.

The present invention has been completed with the above studies conducted by the present inventors, and has an object to provide a battery with a structure that has a high energy density and small in size with lightweight in structure to be optimum as a power source to supply large energy.

Further, according to the studies conducted by the present inventors, it is considered that since a plurality of unit cells are assembled in series connection to form the battery and, during assembling process, with an increase in the number of unit cells to be connected in series, the series connected unit cells have an increased terminal voltage, attentions are required on handling and thus there exists a room for improving workability.

Therefore, the present invention has an another object to provide a method of manufacturing a battery wherein no high voltage is output in a manufacturing process of the battery.

To achieve the above object, in one aspect of the present invention, a battery comprises: a plurality of unit cells stacked in a stack direction; a plurality of conductive members each having an electric conductivity; and a plurality of insulation members each having an electric insulation property, the plurality of conductive members and the plurality of insulation members being alternately disposed in the stack direction with the plurality of unit cells having respective output terminals being sandwiched, whereby the plurality of unit cells are electrically connected in the stack direction.

In the meanwhile, in another aspect of the present invention, a method of manufacturing a battery, comprises: stacking a plurality of unit cells in a stack direction such that the plurality of conductive members and the plurality of insulation members are alternately disposed in the stack direction with the plurality of unit cells having respective output terminals being sandwiched while the plurality of conductive members have temporary insulation members; temporarily fastening the plurality of conductive members; removing the temporary insulation members from the plurality of conductive members; and fully tightening the plurality of unit cells by applying a compression force between the output terminals of the plurality of unit cells to remove the temporary insulation members from the conductive members.

Other and further features, advantages, and benefits of the present invention will become more apparent from the following description taken in conjunction with the following drawings.

BRIEF DESCRIPTION OF THE DRAWINGS

FIG. 6A is a cross sectional view taken on line B-B of FIG. 1 and a view illustrating an initial state of the pressurizing unit of the battery shown in FIG. 1;

FIG. 6B is a cross sectional view taken on line B-B of FIG. 1 and a view illustrating a condition where the pressurizing unit is disposed between the outer layer heat sinks;

FIG. 6C is a plan view of an inserter of the spring retainer of the pressurizing unit of the battery of the presently filed embodiment;

FIG. 7 is an exploded perspective view of the battery of the presently filed embodiment;

FIG. 22A is a plan view illustrating one example of an electrically conductive washer with an insulation film in the presently filed embodiment;

FIG. 22B is a cross sectional view taken on line F-F of FIG. 22A;

FIG. 22C is a plan view illustrating another example of an electrically conductive washer with an insulation film in the presently filed embodiment;

FIG. 22D is a cross sectional view taken on line G-G of FIG. 22C;

FIG. 22E is a plan view illustrating still another example of an electrically conductive washer with an insulation film in the presently filed embodiment;

FIG. 22F is a cross sectional view taken on line H-H of FIG. 22E;

DETAILED DESCRIPTION OF THE PREFERRED EMBODIMENTS

Hereinafter, batteries and related methods of various embodiments according to the present invention are described with suitable reference to the accompanying drawings. Incidentally, throughout several views, x-, y- and z-axes form a three-axis rectangular coordinate system.

First Embodiment

Now, a battery and its related method of a first embodiment according to the present invention is described in detail with reference to FIGS. 1 to 7.

First, description is made of a schematic structure of the battery of the presently filed embodiment.

Figure 1:
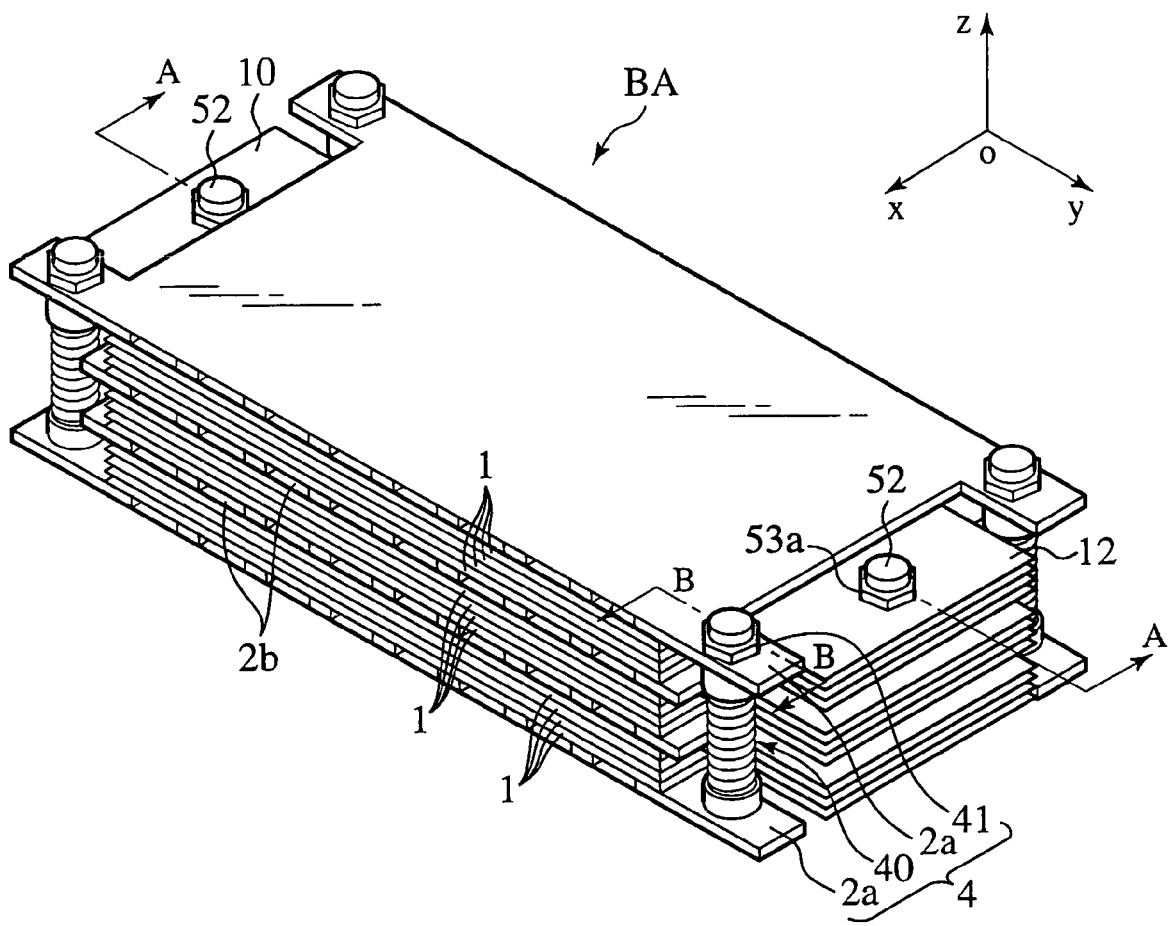
FIG. 1 is a perspective view of a battery of a first embodiment according to the present invention.
Figure 2:
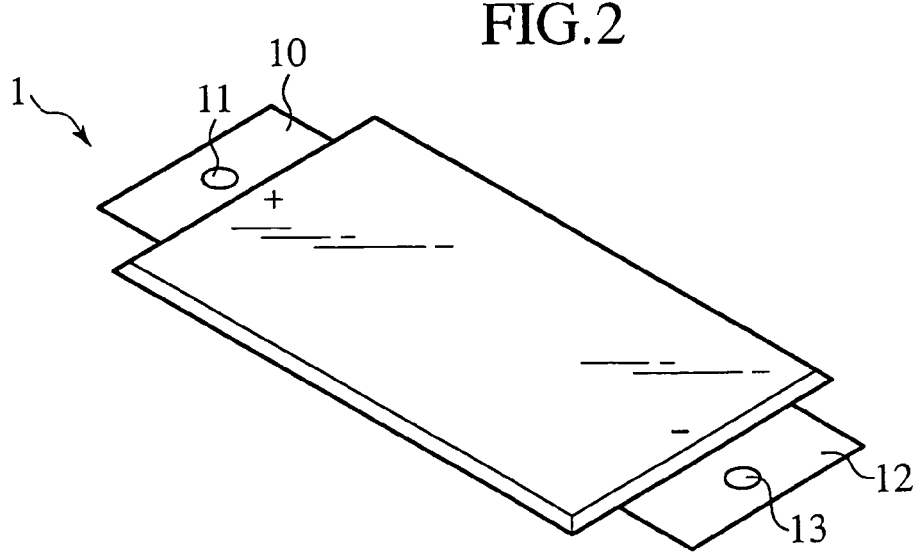
FIG. 2 is a perspective view of a unit cell of the battery of the presently filed embodiment.

FIG. 1 is a perspective view of the battery BA of the presently filed embodiment;. FIG. 2 is a perspective view of a unit cell forming such a battery; and FIG. 3 is a cross section taken on line A-A of FIG. 1.

Figure 3:
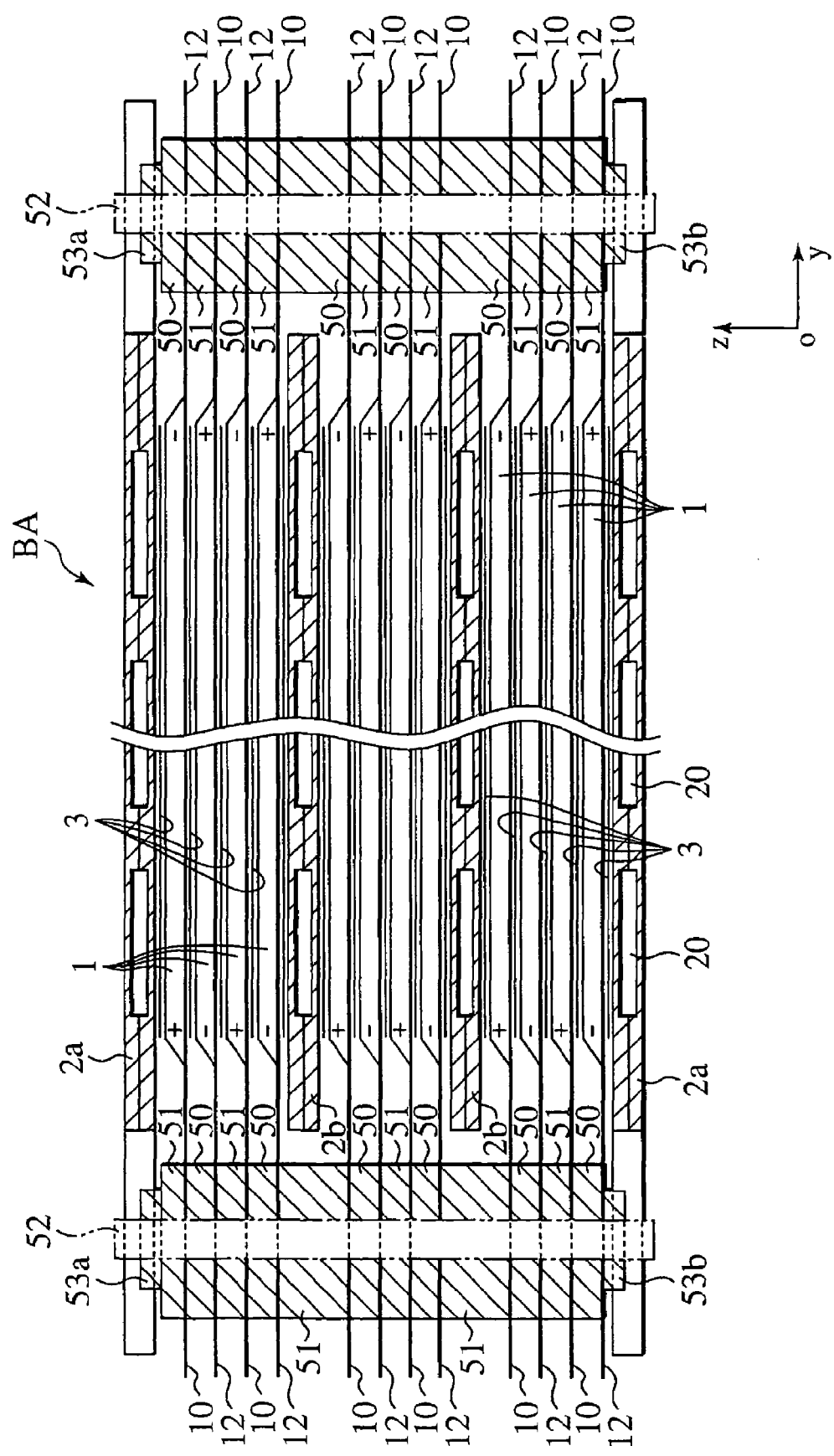
FIG. 3 is a cross sectional view taken on line A-A of the battery shown in FIG. 1.

As shown in FIGS. 1 to 3, the battery BA of the presently filed embodiment has a schematic structure that is comprised of a stack of a plurality of flat-shaped cells 1 (hereinafter merely referred to as unit cells), heat sinks 2a, 2b stacked on the unit cells 1, high friction sheets 3 interposed between the unit cells 1 and between the unit cells 1 and the heat sinks 2a, 2b, and a holding mechanism 4 by which the plural stacked unit cells 1 are pressurized on both sides in a stack direction (along z-direction) to be integrally held in place.

The unit cells 1 are connected in series in the stack direction. That is, two electrode tabs 10, 12 extending from the respective unit cells 1 are connected in series to preclude short-circuiting by permitting electrically conductive washers 50 and insulation washers 51 to be alternately disposed.

Hereinafter, the battery BA and component elements thereof are described in detail further with reference to other drawings when needed.

<Unit Cell>

The unit cell 1, formed in a flat shape in the presently filed embodiment, internally includes an electric power generating element comprised of a positive electrode plate, a negative electrode plate and a separator, all of which are stacked in such order. The unit cell 1 forms a secondary battery, such as a lithium ion secondary battery, employing a gel polymer electrolyte.

With the unit cell 1, a laminate film with a three-layer structure is used as an outer sheath and formed in three layers that include an aluminum foil interposed between resin films each made of polyamide resin. Of two laminate films, one sheet is formed in a flat shape by pressing and laminated onto another sheet of laminate film, remaining in a sheet form, at respective rims by thermal welding. The electric power generating element is hermetically sealed inside the laminated laminate films. When performing such pressing, although the laminate films are introduced into a die, the outermost layer of the laminate films is formed of a resin film with a small skin friction coefficient and, hence, no laminate film suffers from adverse affect arising from friction between the laminate film and the die. Incidentally, with the battery BA, the unit cells 1 are stacked in the same direction as the stack direction of the capsulated electric power generating element.

The unit cell 1 has the positive electrode tab 10 and the negative electrode tab 12 as tabs forming output terminals extending in a direction perpendicular to the stack direction. The positive electrode tab 10 and the negative electrode tab 12 are extracted outside an outer sheath. Formed in the positive electrode tab 10 and the negative electrode tab 12, respectively, are holes 11, 13, to which insulator pins 52, each having a surface subjected to insulation treatment, are inserted.

As will be understood by referring to FIG. 3, the unit cells 1 are alternately stacked such that the electrode tabs have positive and negative polarities alternately arranged in the stack direction, i.e., the positive electrode tab 10 and the negative electrode tab 12 are alternately stacked. The electrically conductive washers 50 and the insulation washes 51 are alternately set through the insulator pins 52 such that the positive electrode tabs 10 and the negative electrode tabs 12 are sandwiched. In particular, the insulation washer 51 is interposed between the positive electrode tab 10 and the negative electrode tab 12 layered thereon, and the electrically conductive washer 50 is interposed between the negative electrode tab 12 and the positive electrode tab 10 layered thereon. When focusing the washer on the same tier, with the presently filed embodiment, the insulation washer 51 is placed on the positive electrode tab 10 and the electrically conductive washer 50 is placed on the negative electrode tab 12. Incidentally, although the electrically conductive washer 50 and the insulation washer 51 are located on the positive electrode tab 10 and the negative electrode tab 12 of the unit cell 1 remaining in the uppermost layer, respectively, in dependence on a sequence in which the electrode tabs are arranged, it doesn't matter if these component parts are dispensed with depending on circumstances.

The electrically conductive washer 50 may be formed of electrically conductive metal, such as copper or aluminum, to allow the positive electrode tab 10 and the negative electrode tab 12, which remain in contact with one above the other, to be electrically connected. On the other hand, the insulation washer 51 is formed of insulation metal, such as ceramic, to allow the positive electrode tab 10 and the negative electrode tab 12, which remain in contact with one above the other, to be insulated. The electrically conductive washer 50 and the insulation washer 51 serve as spacers by which direct contact is avoided between the positive electrode tab 10 and the negative electrode tab 12 of the unit cells 1.

Thus, with the positive electrode tab 10 and the negative electrode tab 12 alternately arranged in the stack direction, the battery BA internally has a circuitry by which the unit cells 1 are electrically connected to allow electric current to flow from an upper layer to a lower layer of a stacked structure. Incidentally, when desired to allow electric current to flow from the lower layer to the upper layer of the stacked structure, it may be suffice for the electrically conductive washer 50 and the insulation washer 51 to be reversely arranged.

The insulator pins 52 are subjected to insulation treatment involving a heat contracting tube covered on a surface of a metallic bar, resin applied onto the metal surface, coating or shielding conducted on the metal surface. Nuts 53a, 53b are tightened on top and bottom ends of the insulator pins 52. This allows the electrode tabs 10, 12 of the unit cells 1 to be firmly interposed between the electrically conductive washers 50 and the insulation washers 51, thereby enabling the electrode tabs 10, 12 to electrically conduct or to be electrically insulated from one another in a reliable manner.

Here, the electrically conductive washer 50 and the insulation washer 51 may preferably have surface roughness of a value as small as possible. If surface roughness is large, surfaces of the electrically conductive washer 50 and the insulation washer 51 are caused to fatigue when tightening the electrically conductive washer 50 and the insulation washer 51 through the nuts 53a, 53b on both sides of the washers and deterioration occurs in tightening force to cause an increase in electrical resistance between the electrode tabs 10, 12 and the electrically conductive washer 50, resulting in deterioration in reliability of electrical connection between the electrode tabs 10, 12.

Incidentally, with the circuit structure formed inside the battery wherein electric current flows from the upper layer toward the lower layer, electric power terminals (not shown) may be placed between the nuts 53a and the electrically conductive washers 50 and between the nuts 53b and the insulation washer 51b to enable electric current to be extracted, while enabling a controller (not shown) to detect a voltage of the battery BA. Also, when combining a plurality of unit cells 1 shown in FIG. 1, it is, of course, to employ such electric power terminals.

<Heat Sink>

Figure 4A:
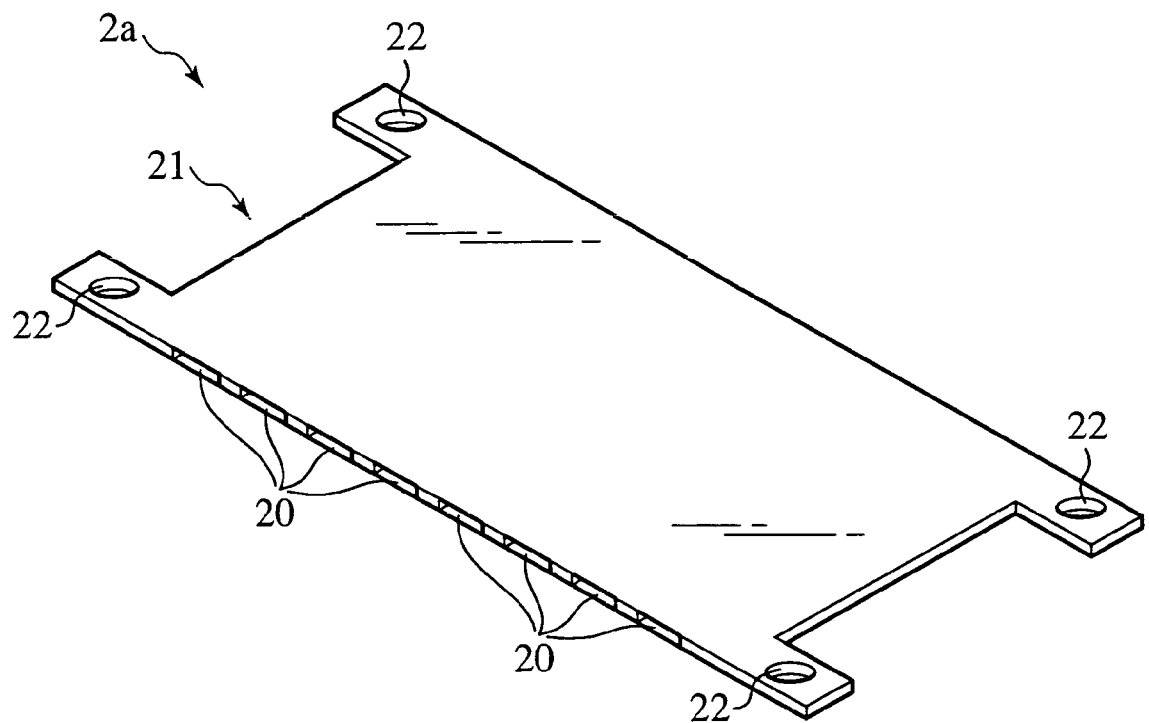
FIG. 4A is a perspective view of an outer layer heat sink of the battery of the presently filed embodiment.
Figure 4B:
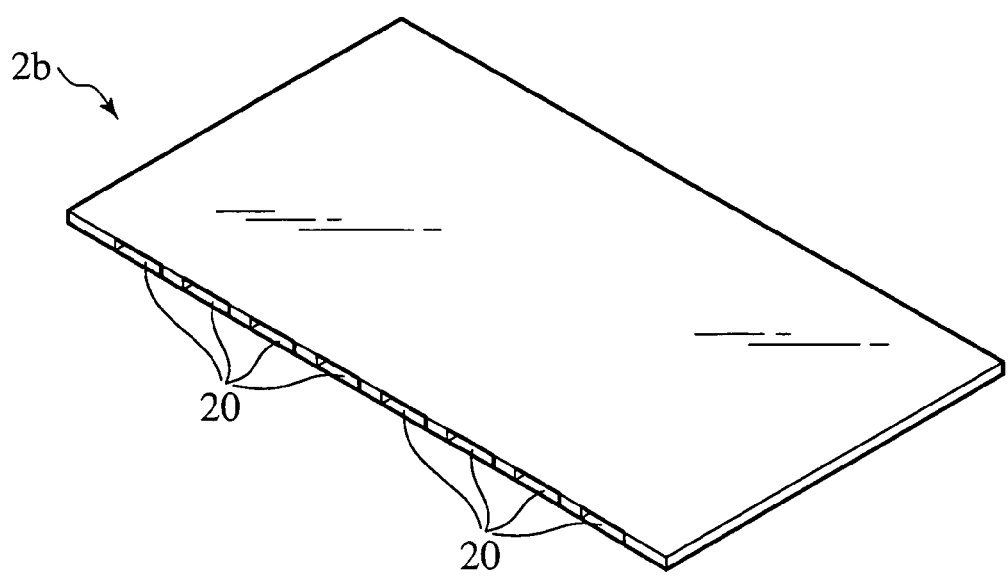
FIG. 4B is a perspective view of an inner layer heat sink of the battery of the presently filed embodiment.

FIG. 4A is a perspective view of an outer layer heat sink 2a, and FIG. 4B is a perspective view of an inner layer heat sink 2b.

As shown in FIGS. 4A and 4B, the heat sinks forming part of the presently filed embodiment include the outer layer heat sinks 2a and the inner layer heat sinks 2b, and the outer layer heat sinks 2a are placed on the outermost layers of the stack structure while the inner layer heat sinks 2b are arranged with the unit cells 1 in a middle of the stack structure of the battery BA.

Any of the heat sinks 2a, 2b is formed with a plurality of ventilation passages 20 to permit coolant, such as air, to pass therethrough. These ventilation passages 20 are formed in two sheets of plate materials, whose surfaces are formed with pluralities of recesses, respectively, which are laminated so as to allow the respective recesses to be mutually aligned for thereby forming the respective heat sinks 2a, 2b. This is based on a consideration on a difficulty encountered in hollowing the ventilation passages through the heat sinks 2a, 2b that are extremely thin. Of course, the respective heat sinks 2a, 2b may be formed of unitary plate materials, respectively, which are formed by extrusion molding if desired. The outer layer heat sink 2a is formed with cutouts 21 to allow the electrode tabs 10, 12 of the stacked unit cell 1 to be exposed to the outside and have four corners formed with holes 22, respectively, between two of which the cutout 21 is intervened. The holes 22 are formed for the purpose of mounting pressurizing units 40, respectively, to apply necessary surface pressures to the stacked unit cells 1 between the outer layer heat sinks 2a.

No holes 22, like those of the outer layer heat sinks 2a, are present in the inner heat sinks 2b. The inner heat sinks 2b are held in pressured surface contact with the unit cells 1 by means of the pressurizing units 40 when the unit cells 1 are stacked in the battery BA. The inner layer heat sink 2b is suitably disposed between the unit cells 1 in such away that when four sheets of unit cells 1 are stacked, one sheet of inner layer heat sink 2b is set on such a stack, as shown in FIG. 3. This enables heat, built up in the unit cells 1, to be radiated from the stack structure.

<High Friction Sheet>

The high friction sheet 3 of the presently filed embodiment is interposed between the unit cells 1 or between the unit cell 1 and the heat sink 2a, 2b as shown in FIG. 3. The high friction sheet 3 is made of silicone rubber that is formed in a sheet configuration. Silicone rubber exhibits higher frictional resistance than that occurring when the unit cells 1 are mutually and directly laminated. Accordingly, intervening the high friction sheets 3 between the unit cells 1 or between the unit cells 1 and the heat sinks 2a, 2b minimizes transverse displacement of these component parts.

In the meanwhile, although the high friction sheet 3 exhibits a high frictional force in terms of transverse displacement, almost no adhesion is exhibited in terms of the stack direction of the unit cells 1. Accordingly, the high friction sheet 3 has non-adhesiveness with respect to the unit cell 1 and the heat sink 2. Stated another way, the high friction sheet 3 is not of the type to cause the unit cells 1 per se, or the unit ells 1 and the heat sinks 2a, 2b to be eternally joined and has a property to allow these component elements to be separated from one another.

<Holding Mechanism>

As shown in FIG. 1, the holding mechanism 4 of the presently filed embodiment is comprised of the outer layer heat sinks (holding plate) 2a to be stacked on the outermost layers of the battery BA, the pressurizing units 40 to be disposed between the outer layer heat sinks 2a, and the nuts 41 by which the pressurizing units 40 are mounted to the outer layer heat sinks 2a.

As previously noted, the outer layer heat sinks 2a are stacked on the outermost layers of the battery BA to serve as cooling members for cooling the unit cells 1. In the meanwhile, the outer layer heat sinks 2a also serves as parts of the holding mechanism 4 for applying the surface pressures to the unit cells 1 and the inner layer heat sinks 2b, respectively, which are stacked in the middle of the stack structure in the stack direction, while holding these component elements in fixed place. As the parts of the holding mechanism 4, the outer layer heat sinks 2a exert forces in a direction to cause the associated component elements to get closer to one another by means of the pressurizing units 40.

The pressurizing units 40 are inserted through the holes 22 formed in the outer layer heat sinks 2a and tightened by the nuts 41. The pressurizing units 40 have detailed structures, which are shown in FIGS. 5A to 6C.

Figure 5A:
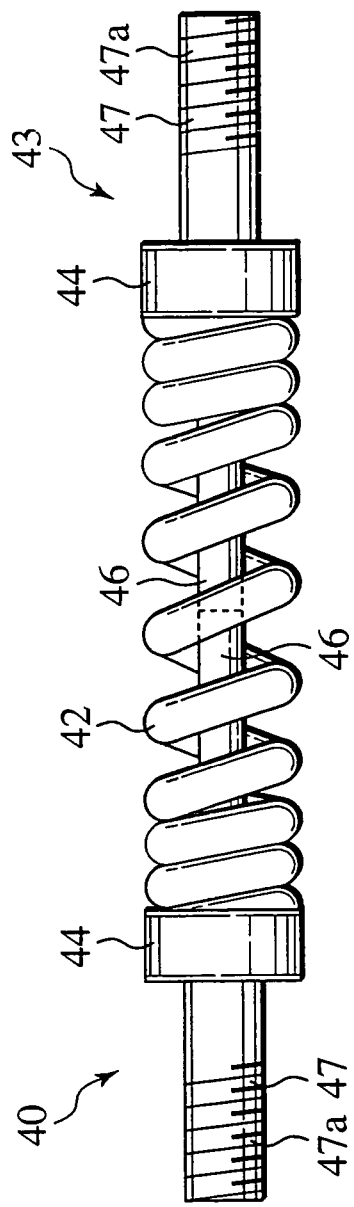
FIG. 5A is a view illustrating an overall structure of a pressurizing unit of the battery of the presently filed embodiment.
Figure 5B:
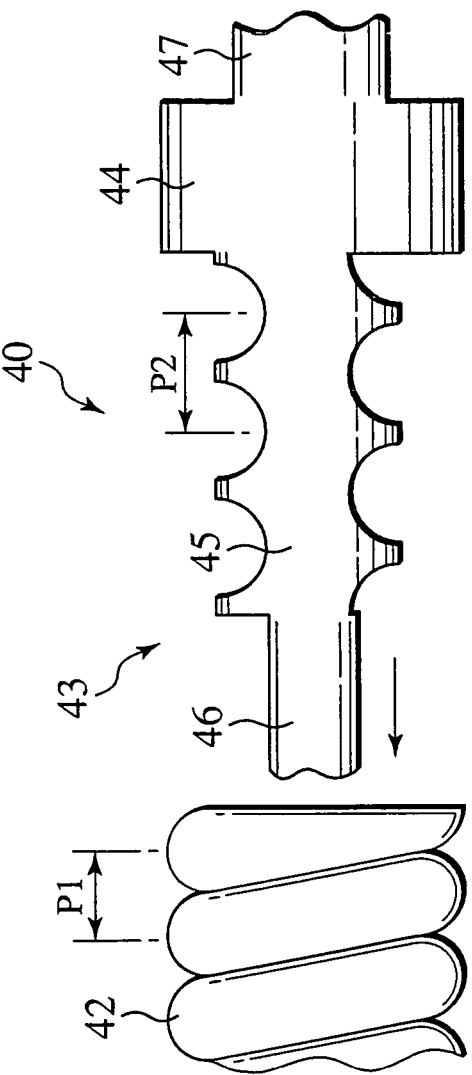
FIG. 5B is a view illustrating a structure of a spring retainer of the battery of the presently filed embodiment.

FIG. 5A is a view illustrating an overall structure of the pressurizing unit 40; FIG. 5B is a view illustrating a structure of a spring retainer of the pressurizing unit 40; FIG. 6A is a cross sectional view taken on line B-B of FIG. 1 and showing an initial state of the pressurizing unit 40; FIG. 6B is a cross sectional view taken on line B-B of FIG. 1 and showing a state where the pressurizing unit 40 is disposed between the outer layer heat sinks 2a; and FIG. 6C is a plan view of an inserter 47 of the spring retainer 43 of the pressurizing unit 40.

As shown in FIGS. 5A to 6C, the pressurizing unit 40 is comprised of a tension coil spring (elastic body) 42, and the spring retainers 43 that retain both ends of the tension coil spring 42.

With the tension coil spring 42 disposed between the outer layer heat sinks 2a in a tensioned state, the tension coil spring 42 exhibits a tensile force to create an elastic force in a direction to cause the outer layer heat sinks 2a to get closer to one another.

The spring retainer 43 includes a body portion 44, a screw portion 45 formed with a thread ridge with a pitch P2 greater than a pitch P1 of the tension coil spring 42, an abutment portion 46 extending toward a center of the tension coil spring 42, and an inserter 47 extending from the body portion 44 and inserted through the outer layer heat sink 2a.

The body portion 44 is brought into abutting engagement with a distal end of the tension coil spring 42 to specify a position of the end of the same. Also, with the pressurizing unit 40 assembled to the battery, the body portion 44 is brought into abutting engagement with the outer layer heat sink 2a to play a role to restrict the tension coil spring 42 from increasing in length.

The screw portion 45 is screwed into the distal end of the tension coil spring 42 and internally engages an inside of the tension coil spring 42 that is consequently fastened. The screw portion 45 has an outer peripheral surface formed with a thread ridge with the pitch P2 as shown in FIG. 5B. The pitch P2 of the screw portion 45 is greater than the pitch P1 of the tension coil spring 42. Consequently, the screw portion 45 can be screwed in a direction, as shown by an arrow in FIG. 5B, and screwing the screw portion 45 causes the abutment portion 46 to advance toward the center of the tension coil spring 42.

When screwing the screw portions 45 from both ends of the tension coil spring 42, the abutment portions 46, advanced from the both sides, are brought into abutment with the associated distal end of the tension coil spring 42 as shown in FIG. 5A. Under such a situation, the tension coil spring 42 is caused to extend from a natural length, thereby affording an initial tensile force under an initial status of the pressurizing unit 40.

The inserter 47 has a distal end formed with a thread ridge 47a to which the nut 41 is fastened. The inserter 47 has a head formed with a fit drive slit 48 as shown in FIG. 6C. Fitting a tip of a minus driver to the slit 48 enables the spring retainer 43 to lock the rotation thereof.

Locating the pressurizing unit 40 between the outer layer heat sinks 2a provides a condition as shown in FIG. 6A.

As shown in FIG. 6A, the inserters 47 are inserted through the holes 22 of the outer layer hat sinks 2a. Under such a condition, as shown in FIGS. 6B and 6C, the rotation of one of the spring retainers 43 is locked while the inserter 47 of the other spring retainer 43 is tightened by the nut 41 in the X-direction and fastened. Then, the spring retainer 43 is pulled toward the nut 41. Likewise, driving the nut 41 allows the inserter 43 of the other remaining spring retainer 43 to be fastened. Then, the spring retainers 43 are pulled away relative to one another with the tension coil spring 42 being retained, and the tension coil spring 42 is retained under circumstances where the tension coil spring 42 is expanded between the outer layer heat sinks 2a.

In such a way, since the tension coil spring 42 is expanded in compliance with a distance between the outer layer heat sinks 2a, it becomes possible to obtain a resilient force acting in a direction to cause the tension coil spring 42 to contract regardless of fastening torques applied by the nuts 41. Such a resilient force affords a pressurizing force to be applied to the unit cells 1 through the outer layer heat sinks 2a.

<Assembling Procedure>

Next, description is made of an assembling procedure for the battery BA of the presently filed embodiment with the structure set forth above.

FIG. 7 is an exploded perspective view illustrating an essential part of the battery BA.

As shown in FIG. 7, first, the outer layer heat sink 2a is set on the lowermost layer and the plural unit cells 1 are stacked thereon. Here, for the plural unit cells 1, the electrode tabs 10, 12 are set through the insulator pins 52 such that the positive electrode tab 10 and the negative electrode tab 12 are alternately arranged in the stack direction. The electrically conductive washer 50 and insulation washer 51 are also sequentially set through the insulator pins 52 each times the electrode tabs 10, 12 of the unit cells 1 are set through the insulator pins 52.

Here, the electrically conductive washers 5o and the insulation washers 51 are set through the insulator pins 52 in alternative arrangement in the stack direction. For the positive electrode tab 10 and the negative electrode tab 12 of the same unit cell 1, the electrically conductive washer 50 is set on the negative electrode tab 12 on one hand and, on the other hand, the insulation washer 51 is set on the positive electrode tab 12. That is, different kinds of washers are set on the positive electrode tab 10 and the negative electrode tab 12, respectively, of the same unit cell 1.

Then, other unit cells 1 are stacked in a plurality of stages, i.e., four sheets of unit cells 1 are stacked, and another inner layer heat sink 2b is set on top of the stacked unit cells 1.

Subsequently, after repeatedly setting the unit cells 1 and the inner layer heat sinks 2b a given number of times, lastly, the outer layer heat sink 2a is set on the top of the stack structure.

Thereafter, the pressurizing units 40 are set between the outer layer heat sinks 2a and the nuts 41 are fastened until the tension coil springs 42 of the pressurizing units 40 are expanded between the outer layer heat sinks 2a, thereby assembling the battery BA as shown in FIG. 1.

Incidentally, the high friction sheets 3 are applied onto the respective surfaces of the unit cells 1, the outer layer heat sinks 2a and the inner layer heat sinks 2b during the stacking thereof.

As set forth above, with the battery BA of the presently filed embodiment, the electrically conductive washers 50 and the insulation washers 51 are alternately set through the insulator pins 52 in the stack direction between the positive electrode tabs 10 and the negative electrode tabs 12 of the stacked unit cells 1. Accordingly, a circuitry, wherein the unit cells 1 stacked in a vertical direction are sequentially connected, can be easily realized through alternate arrangement of the electrically conductive washers 50 and the insulation washers 51.

Incidentally, while the presently filed embodiment has been exemplarily shown in conjunction with a single piece of the battery BA in which the unit cells 1 are vertically stacked, of course, no limitation is intended by the presently filed embodiment and a plurality of batteries, each composed of a plurality of sets of unit cells 1, may be juxtaposed in electrical connection to form a battery module with a further increased power output. In such case, it may be suffice for the batteries to be electrically connected to one another through bus bars mounted to both the batteries. The bus bars may be mounted to the insulator pins 52 and fastened by the nuts 53a, 53b.

Second Embodiment

Next, a battery and its related method of a second embodiment according to the present invention are described in detail with reference to FIG. 8.

Figure 8:
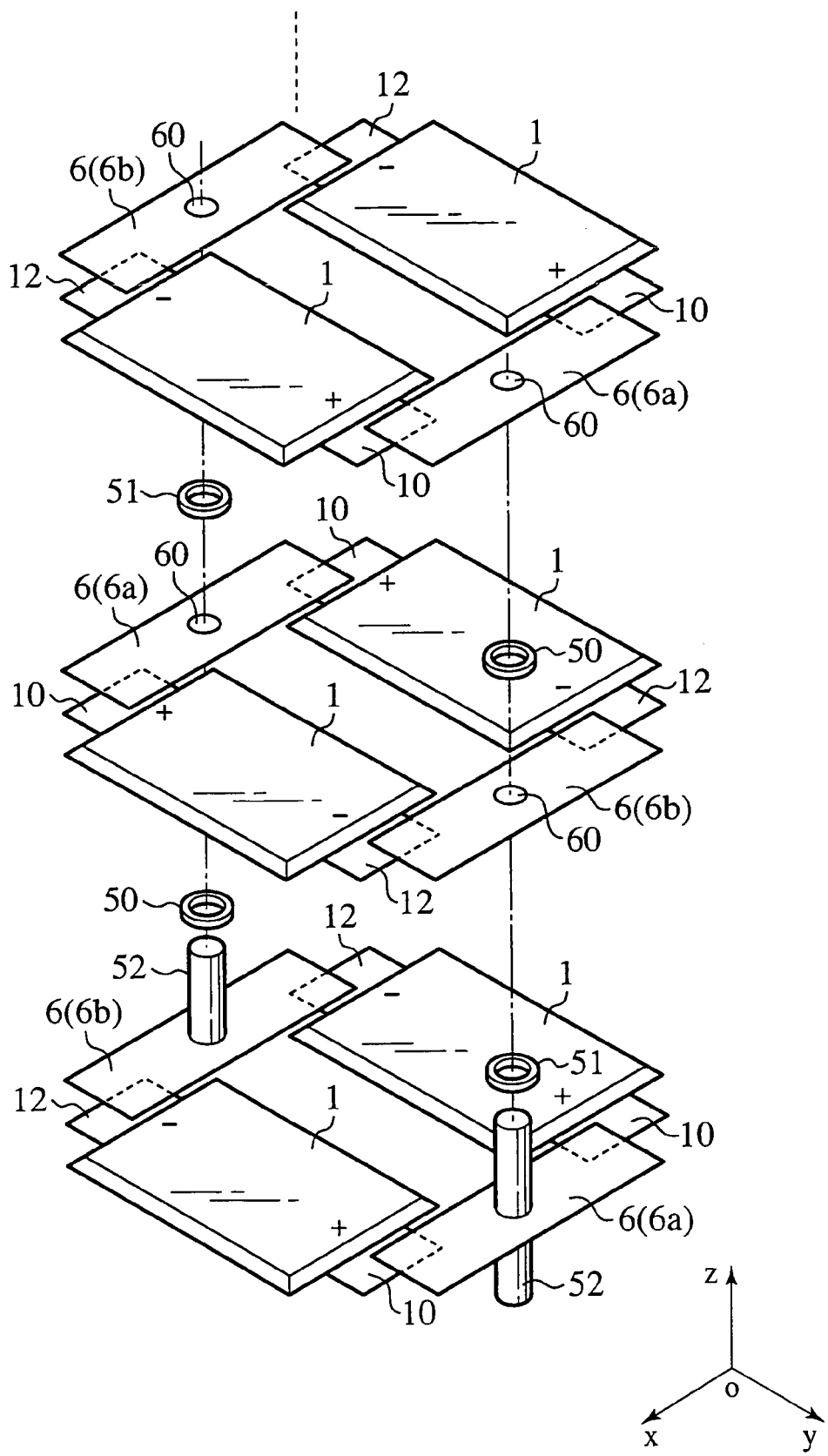
FIG. 8 is an exploded perspective view of a battery of a second embodiment according to the present invention.

FIG. 8 is an exploded perspective view of the battery of the presently filed embodiment.

The presently filed embodiment differs from the first embodiment set forth above in that the first embodiment takes the form a structure wherein the insulator pins 52 are directly inserted to the electrode tabs 10, 12 of the unit cells 1 and the electrically conductive washers 50 and the insulation washers 51 are alternately set through the insulator pins 52, whereas the second embodiment takes the form of a structure wherein no insulator pins 52 are directly inserted to the electrode tabs 10, 12 and the insulator pins 52 are inserted to bus bars (output terminals and parallel connected members) extending from the electrode tabs 10, 12, respectively, and the electrically conductive washer 50 and the insulation washer 51 are alternately set through the insulator pin 52, and is identical in other structure. Hereinafter, such different points are focused in description and the same component parts as those of the first embodiment bear like reference numerals to omit or simplify description.

As shown in FIG. 8, for one set of two unit cells 1, the mutual positive electrode tabs 10 and the mutual negative electrode tabs 12 are connected through the bus bars 6, respectively, to allow the unit cells 1 of one set to be electrically connected in parallel. The bus bars 6 are welded onto and joined to the positive electrode tabs 10 and the negative electrode tabs 12. That is, with such a structure, output terminals of the two unit cells 1 are constituted by the bus bars 6.

Hereinafter, the bus bar 6 that is joined to the positive electrode tabs 10 is referred to as a bus bar 6a, and the bus bar 6 that is joined to the negative electrode tabs 12 is referred to as a bus bar 6b. The bus bars 6a, 6b are formed with holes 60, respectively, to which the insulator pins 52 can be inserted. When structuring the battery, the one set of unit cells 1 is stacked while inserting the insulator pins 52 to the holes 60. Here, when stacking the unit cells 1, the insulator pins 52 are inserted to the holes 60, respectively, such that the bus bars 6a, 6b are alternately stacked in the stack direction. Thus, with the bus bars 6a, 6b being inserted to the insulator pins 52, respectively, each set of the unit cells 1 can be positioned.

The electrically conductive washers 50 and the insulation washers 51 are also set through the insulator pins 52, respectively. The electrically conductive washers 50 and the insulation washers 51 are alternately set through each insulator pin 52 in the stack direction between the bus bars 6a, 6b one by one. As shown in FIG. 8, the insulation washer 51 is set through the insulator pin 52 in such a way that the insulation washer 51 is set on the bus bar 6a at the lowermost layer, as viewed in the drawing figure, and the electrically conductive washer 50 is set through the insulator pin 52 such that it is set on the bus bar 6b above the bus bar 6a.

Incidentally, while the illustrations of the heat sinks 2a, 2b and the high friction sheets 3 are omitted from FIG. 8 for the purpose of illustrating a way in which the unit cells 1 are stacked, it is, of course, to be appreciated that when forming the battery, the outer layer heat sinks 2a are set on both surfaces of the outermost layers of the stack structure and the heat sink 2b is set for each stack of the unit cells 1 set in plural stages like in the first embodiment. Then, the pressurizing units 40 are disposed between the outer layer heat sinks 2a to apply the surface pressures to the unit cells 1 to hold the same in fixed place. Also, the high friction sheets 3 are applied to the respective surfaces of the unit cells 1, the outer layer heat sinks 2a and the inner heat sinks 2b during stacking procedure.

As set forth above, with the battery of the presently filed embodiment, the bus bars 6a, 6b are alternately set through the insulator pins 52 in the stack direction and the electrically conductive washers 50 and the insulation washers 51 are alternately set through the insulator pins 52 in the stack direction. Accordingly, the unit cells 1 are connected in parallel in a direction perpendicular to the stack direction and connected in series in the stack direction.

Incidentally, the presently filed embodiment has been described with reference to an exemplary structure wherein two unit cells 1 are connected in parallel through the bus bars 6, no limitation is intended by the presently filed embodiment and more than three unit cells 1 may be connected in parallel if desired.

Third Embodiment

Now, a battery and its related method of a third embodiment according to the present invention are described in detail with reference to FIGS. 9 to 13.

Figure 9:
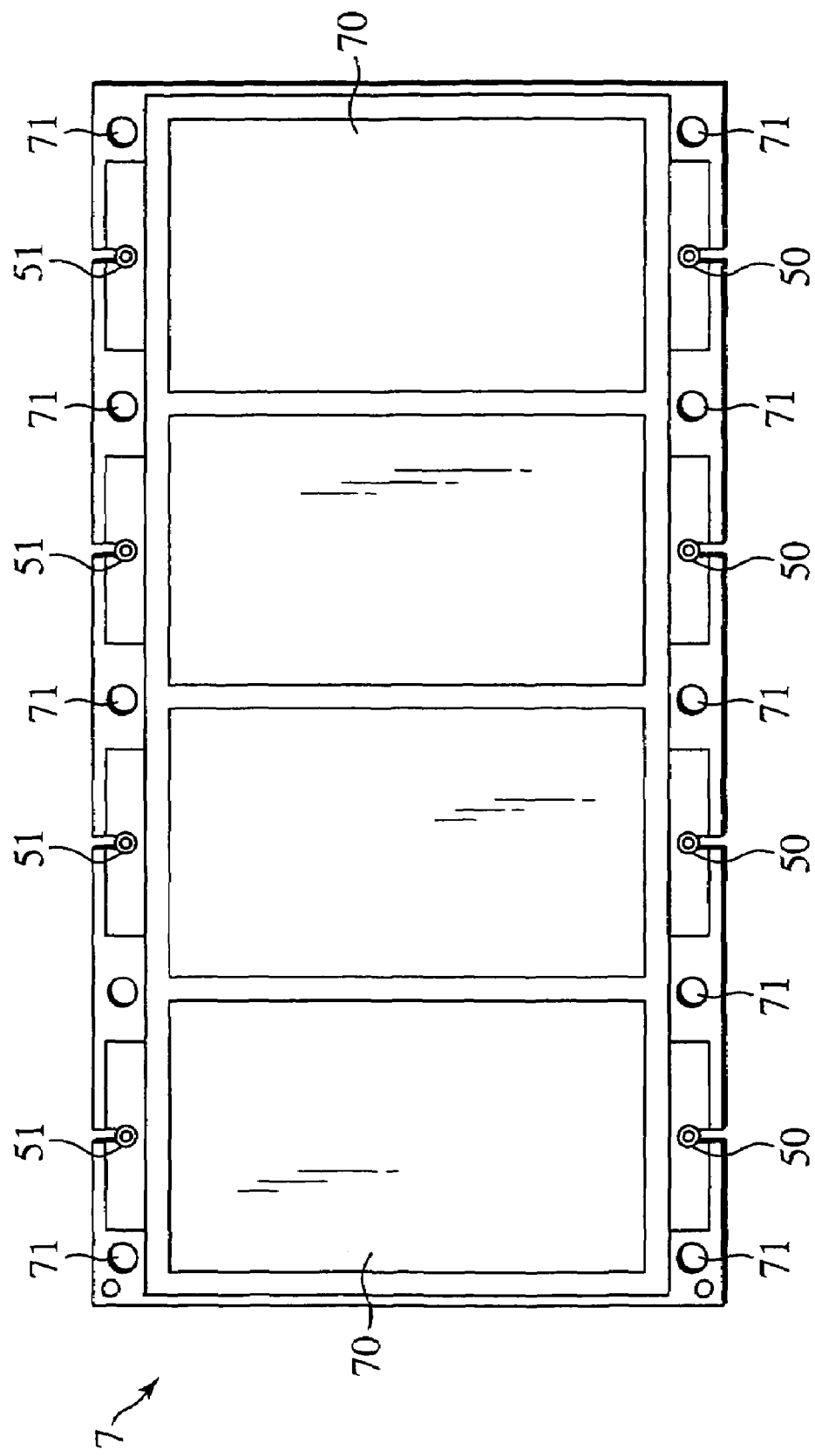
FIG. 9 is a plan view showing a frame of a battery of a third embodiment according to the present invention.
Figure 10:
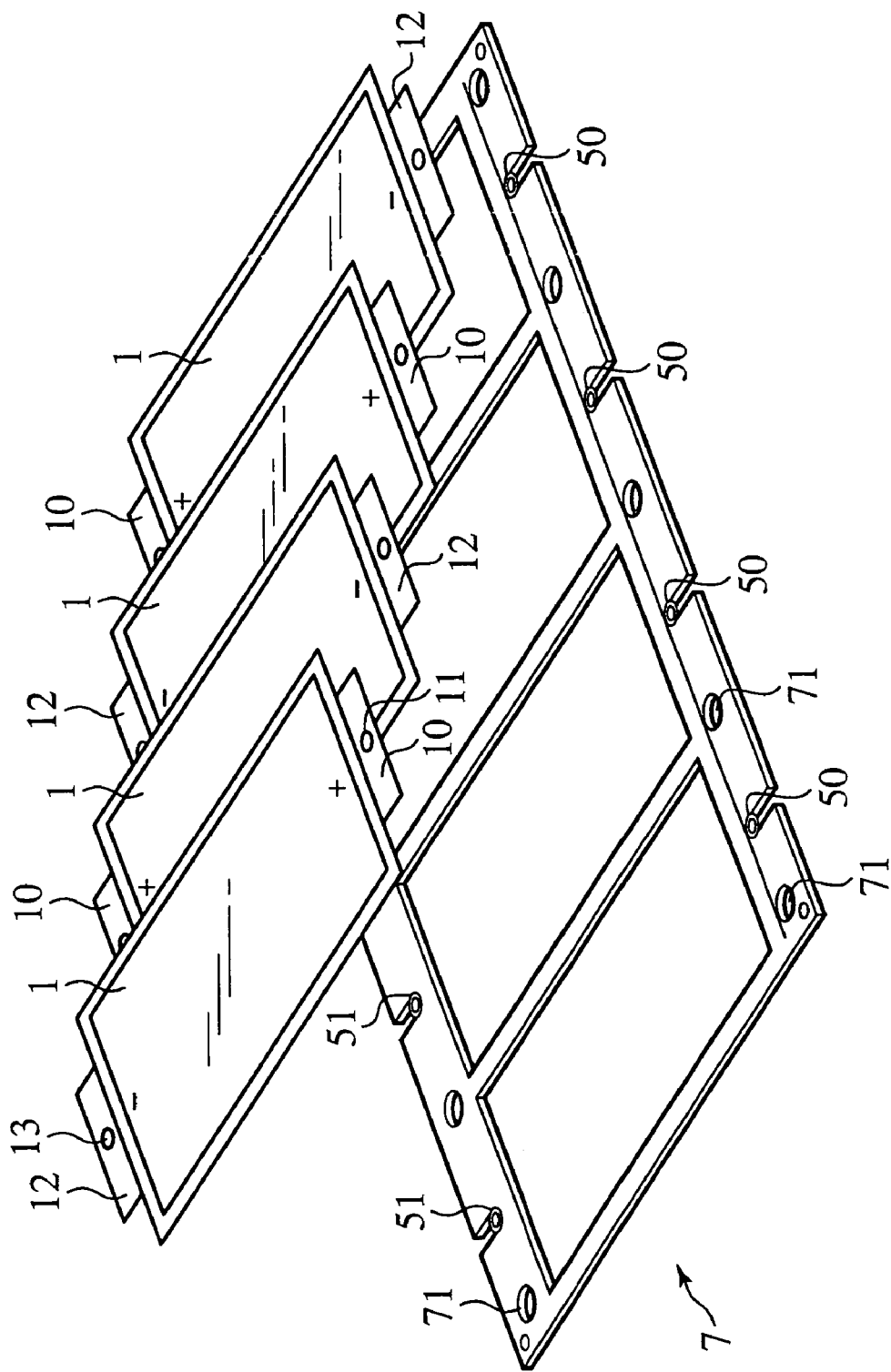
FIG. 10 is a perspective view illustrating a condition wherein unit cells are set on the frame of the battery of the presently filed embodiment.
Figure 11:
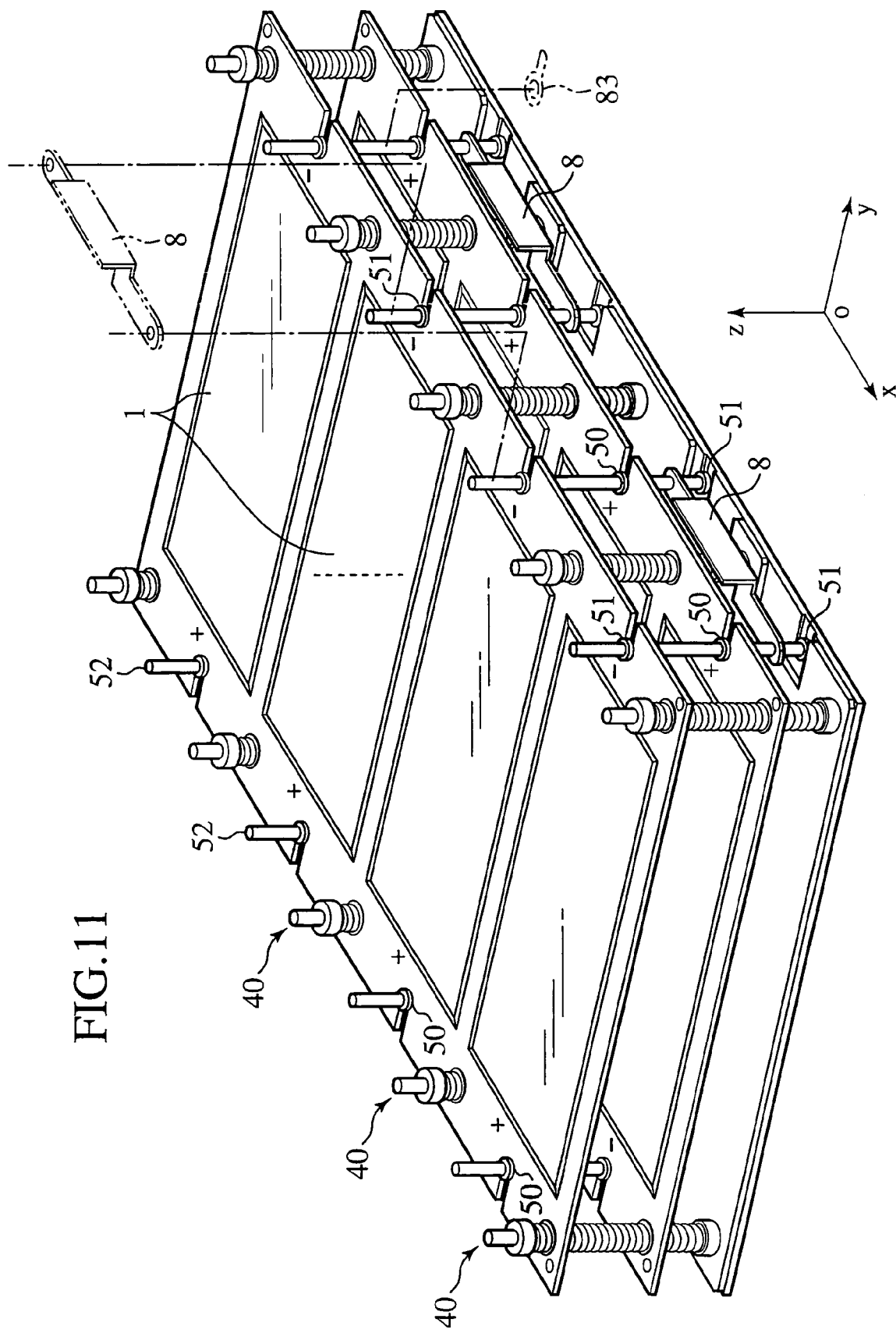
FIG. 11 is a perspective view illustrating the battery in assembling process in the presently filed embodiment.
Figure 12:
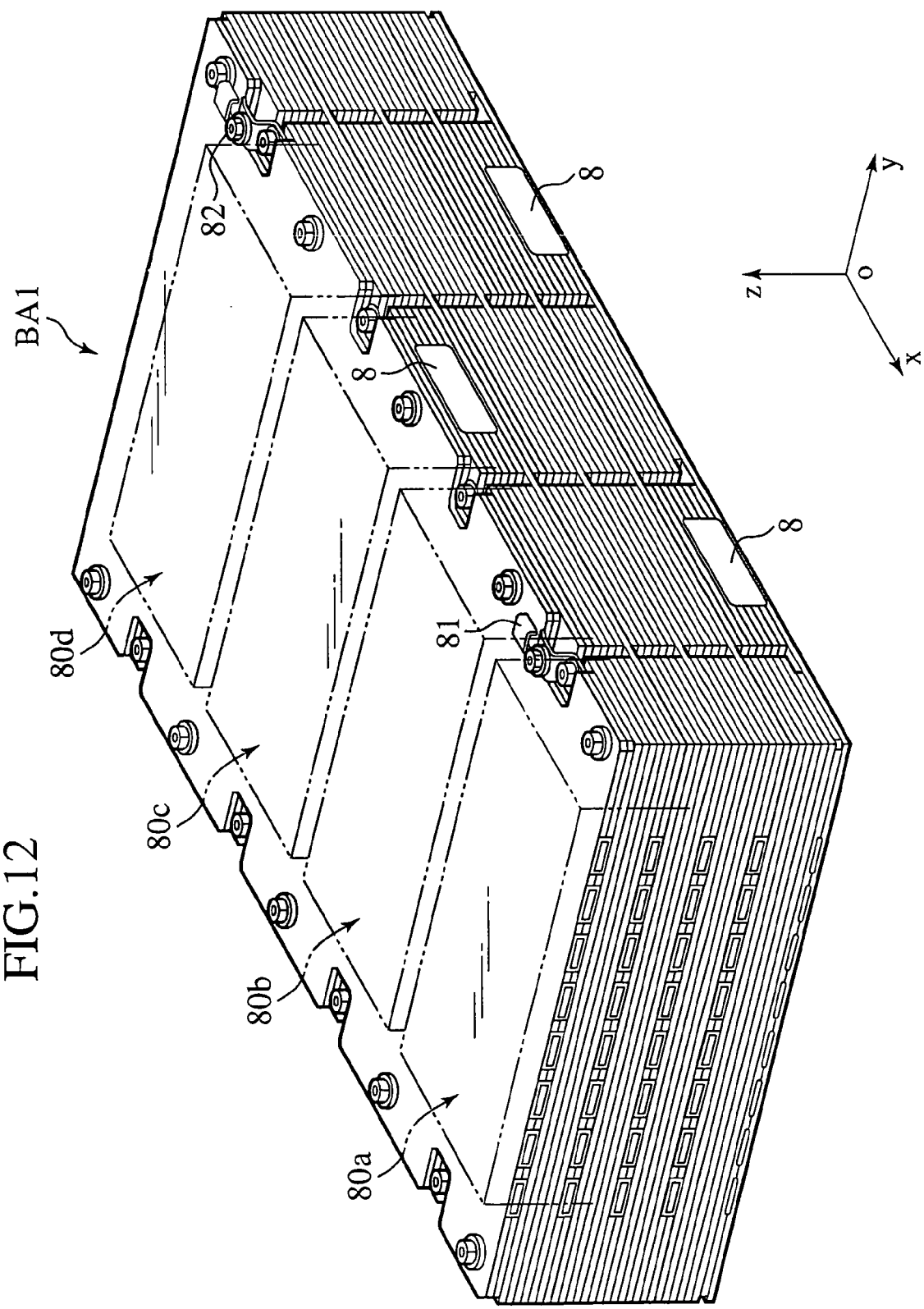
FIG. 12 is a perspective view of the battery of the presently filed embodiment.
Figure 13:
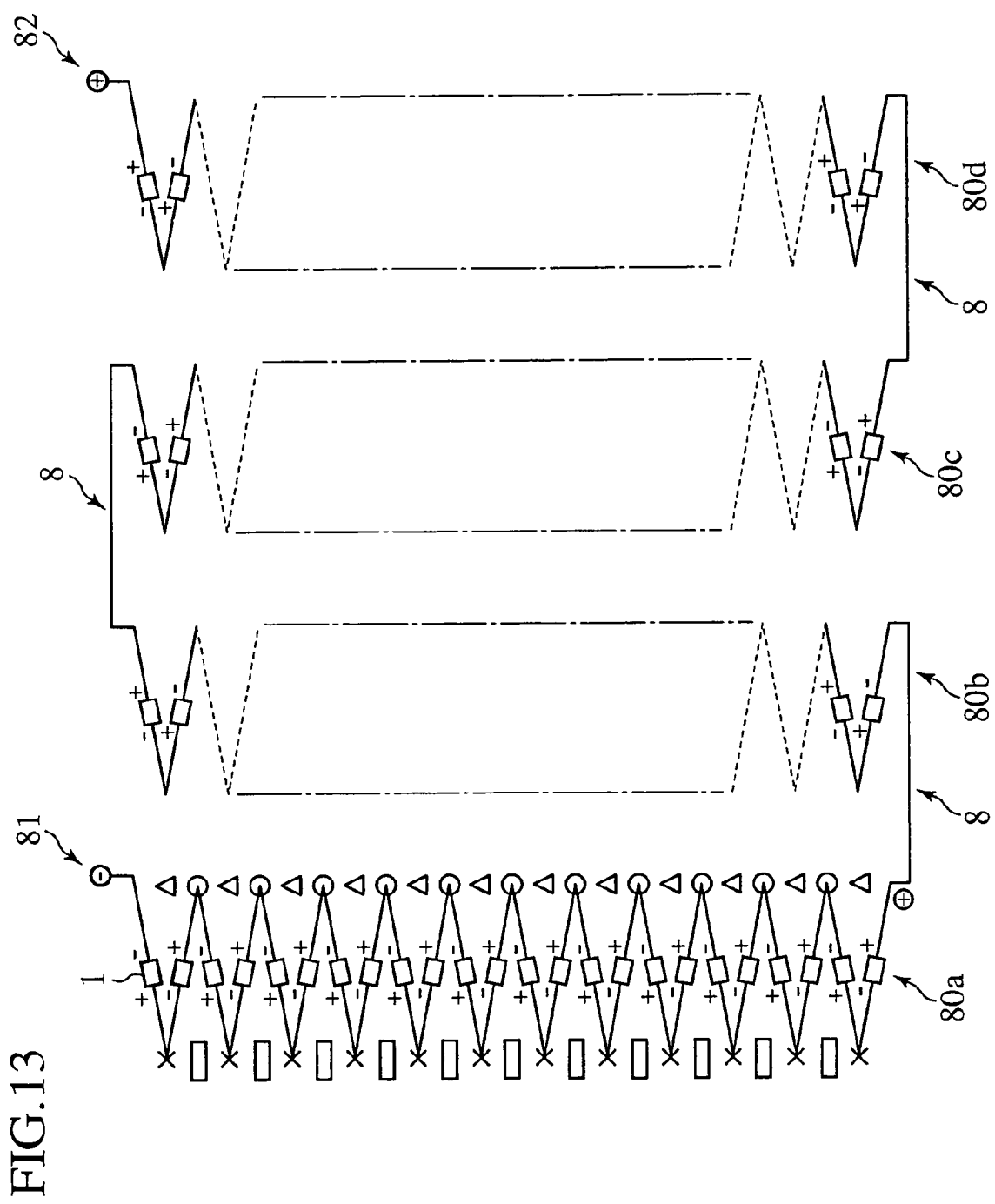
FIG. 13 is a schematic view illustrating a circuit structure of the battery of the presently filed embodiment.

FIG. 9 is a plan view illustrating a frame 7 of a battery of the presently filed embodiment; FIG. 10 is a perspective view illustrating a condition where the unit cells 1 are set on the frame 7; FIG. 11 is a perspective view illustrating the battery during assembling procedure; FIG. 12 is a perspective view of the battery BA1 after assembling; and FIG. 13 is a schematic view illustrating a circuit structure of the battery BA1. Incidentally, in FIG. 11, the electrode tabs of the unit cells 1 are omitted for the electrically conductive washers 50 and the insulation washers 51 to be easily viewed.

The presently filed embodiment mainly differs from the first embodiment set forth above in that the first embodiment takes the form of a structure wherein the unit cells 1 are set through the electrically conductive washers 50 and the insulation washers 51 as they are, whereas the presently filed embodiment takes the form of a structure wherein the unit cells 1 are stacked under a condition where the fuel cells 1 are set on the frames 7, and is identical in other structure. Hereinafter, such different point is focused on description and the same component parts as those of the first embodiment bear like reference numerals to omit or simplify description.

That is, the battery of the presently filed embodiment is similar to that of the first embodiment in that the outer layer heat sinks 2a are set on the outermost layers of the stack structure but differs in structure in that the frames 7 and the inner layer heat sinks 2b, shown in FIGS. 9 and 10, are incorporated in the stack structure wherein the inner layer heat sinks 2b are set each for a plurality of stacked frames 7. Also, in the presently filed embodiment, in order to form a series circuit in the battery BA1, the bus bars 8 are mounted to the stack structure. First, description is made of the frame 7.

<Frame>

As shown in FIGS. 9 and 10, the frame 7 of the presently filed embodiment has one side in which the electrically conductive washers 50 are embedded and the other side in which the insulation washers 51 are embedded. The electrically conductive washers 50 are formed in a thickness slightly greater than that (thickness in the stack direction of the battery) of the frame 7 but less than that (thickness in the stack direction of the battery) of the unit cell 1. The insulation washers 51 are also formed in a thickness greater than that of the frame 7 but less than that of the unit cell 1 like the electrically conductive washers 50.

The frame 7 is formed with plural positioning sections 70 on which the associated unit cells 1 are set in given positions, respectively. The positioning sections 70 are formed of cutouts, respectively, each with a size less than an outer shape of each unit cell 1. Each of the positioning sections 70 is opened in an area to the extent in that when setting the unit cell 1 on the positioning section 70, a peripheral edge of the unit cell 1 can be retained while permitting the unit cell 1 to be brought into contact with the other unit cell 1, set on upper or lower layers, at an area except the peripheral edge. The unit cells 1 are set on the frame 7 in such a way to allow the electrode tabs 10, 12 to be brought into contact with the electrically conductive washers 50 and the insulation washers 51. With the positioning being finished, the bores (holes) of the electrically conductive washers 50 and the insulation washers 51 are brought into alignment with the holes 11 of the positive electrode tabs 10 of the unit cells 1 and holes 13 of the negative electrode tabs 12 of the unit cells 1, respectively.

Formed in the frame 7 are holes 71 that allow the pressurizing units 40 to be inserted during stacking work. The pressurizing units 40 are set between the outer layer heat sinks 2a at areas outside the unit cells 1 in the first embodiment and, in the presently filed embodiment, set between the outer layer heat sinks 2a in a way to extend through the frames 7, the inner layer heat sinks 2b and the outer layer heat sinks 2a.

On the frame 7, adjacent unit cells 1 are set such that the positive electrode tab 10 and the negative electrode tab 12 are oriented in an opposite direction. As shown in FIG. 10, the unit cells 1 are arranged such that the positive electrode tabs 10 and the negative electrode tabs 12 are alternately arranged in order at a front side as shown in FIG. 10.

A plurality of frames 7, on each of which a plurality of unit ells 1 are set, are stacked by setting the pressurizing units 40 and the insulator pins 52 as shown in FIG. 11. Incidentally, the pressurizing units 40 and the insulator pins 52 are fastened to the outer layer heat sinks 2a by nuts, which are not shown, to stand upright. Further, with the battery BA1 being completely assembled, the pressurizing units 40 are fixedly secured between the outer layer heat sinks 2a, as shown in FIG. 12, to apply a force in a direction to cause the outer layer heat sinks 2a to get closer to apply a certain surface pressure to each unit cell 1.

When stacking the frames 7, the electrode tabs 10, 12 of the unit cells 1 are alternately arranged in the stack direction. Upon focusing on one side of the frame 7 in immediately lower layer, where the electrode tabs are arranged in an order with the positive electrode tab 10, the negative electrode tab 12, the positive electrode tab 10 and the negative electrode tab 12, an upper layer immediately above the lower layer has the electrode tabs arranged in another order with the negative electrode tab 12, the positive electrode tab 10, the negative electrode tab 12 and the positive electrode tab 10 at the same side. Further, when stacking the frames 7, since the electrically conductive washers 50 and the insulation washers 51 are embedded in the frames 7, as set forth above, the frames 7 are stacked such that the electrically conductive washers 50 and the insulation washers 51 are alternately positioned in the stack direction.

Sequentially setting the plural unit cells 1 on the frame 7 in an array to allow the respective frames 7 to be stacked one above the other, as set forth above, results in a completed assembly of the battery BA1 where the unit cells 1, set in the stack direction, are connected in series. With the presently filed embodiment, as shown in FIGS. 11 and 12, the battery BA1 has four arrays of units, each including a stack of the unit cells 1 and these units, i.e., battery units 80a, 80b, 80c, 80d that are connected in series.

More particularly, in order for the battery units 80a and 80c to be connected in series from an upper layer toward a lower layer and for the battery units 80b and 80d to be connected in series from the lower layer toward the upper layer, both a placement direction for the electrode tabs 10, 12 of the respective unit cells 1 and a placement direction for the electrically conductive washers 50 and the insulation washers 51 are determined, and the battery units 80a, 80b, 80c, 80d are connected in series. In order for the battery units 80a, 80b, 80c, 80d to be connected in series, the bus bars 8 are employed. The battery units 80a, 80b are connected through the bus bar 8 in the lowermost layer, the battery units 80b, 80c are connected through the bus bar 8 in the uppermost layer, and the battery units 80c, 80d are connected through the bus bar 8 in the lowermost layer, as shown in FIGS. 11 and 12.

Thus, with the plural battery units 80a to 80d connected through the bus bars 8, the unit cells 1 of the battery BA1 as a whole are connected in series. This allows electrode terminals 81, 82 to be connected to the negative electrode tab 12 of the uppermost layer of the battery unit 80a and the positive electrode tab 10 of the uppermost layer of the battery unit 80d, respectively, providing a high voltage. The resulting schematic circuit structure formed inside the battery is shown in FIG. 13.

As set forth above, with the third embodiment, the unit cells 1 are set on the frames 7 in an array and such frames 7 are stacked one above the other. Here, the electrically conductive washers 50 are embedded in one side of the frame 7 whose other side is embedded with the insulation washers 51, whereupon the frames 7 are stacked by reversing the orientation of the frames 7 such that the washers 50, 51 are alternately arranged in the stack direction. Accordingly, this results in a circuit structure where the unit cells 1 are connected in series in the stack direction like in the embodiments 1, 2.

Incidentally, the presently filed embodiment has been described in conjunction with an exemplary structure where the battery has four arrays of unit cells 1 on the frame 7, no limitation is intended to such application and an alternative may have two or three, or more than five arrays of unit cells on the same frame 7 depending on circumstances.

Further, a voltage detection terminal 83 as that shown in FIG. 11 may be set through the insulator pin 52. Locating the voltage detection terminals 83 between the electrically conductive washers 50 and the insulation washers 51, respectively, enables a voltage of each unit cell 1 to be detected. This enables a characteristic of each unit cell 1 to be grasped even after the battery is installed on a vehicle.

The battery, discussed above in conjunction with the embodiments 1 to 3, has a number of advantages as will be described below.

Such a battery takes a structure where the electrically conductive washers 50 and the insulation washers 51 are alternately arranged in a direction to allow the unit cells 1 to be stacked in electrical connection along the stack direction and no need arises for carrying out welding or soldering for electrical connection, enabling reduction in the number of man-hour while making it possible to easily and reliably form a circuitry to interconnect the unit cells in the battery. Especially, with the structure of the third embodiment, since the electrically conductive washers 50 and the insulation washers 51 are incorporated in the frames 7, respectively, merely stacking the frames 7, on each of which the unit cells 1 are set in array, provides a capability of realizing a circuitry in which the unit cells 1 are simply and reliably connected.

Further, the electrically conductive washers 50 and the insulation washers 51 are available to be set through the insulator pins 52, providing an ease of mounting the electrically conductive washers 50 and the insulation washers 51 during assembly.

Furthermore, with the structures of the embodiments 1 and 3, although the electrode tabs 10, 12 of the unit cells 1 are set through the insulator pins 52, the provision of the holes 11, 13, each with a diameter substantially equal to an outer diameter of each insulator pin 52, allows the positioning of these component elements to be simply and reliably performed.

Moreover, with the structure of the second embodiment, inserting the insulator pins 52 through the bus bars 6 enables the unit cells 1, connected in parallel, to be directly connected, thereby enabling the positioning of these component elements to be simply and reliably performed.

Additionally, since the surface pressures are applied to the unit cells 1 by the pressurizing units 40, even if the unit cells 1 are subjected to frequent charging and discharging cycles, it becomes possible to preclude a capacity and operating life of the battery from being adversely affected by gases that would be created inside the unit cells 1.

Besides, with such a battery, the unit cells 1 are stacked with no clearance so as to allow the requisite number of the inner layer heat sinks 2b to be intervened depending upon a demanded amount of heat to be radiated whereby no appropriate surface pressure needs to be applied to the respective unit cells 1, providing a capability of realizing a minimized battery, with high energy density, suited for installation on an automobile. Additionally, the battery has a rigid structure in the absence of clearance, resulting in an increased rigidity and excellent anti-vibration property.

Incidentally, with the structures of the embodiments 1 to 3, electrical connection is established among the entire unit cells in the stack direction through the use of electrically conductive washers, it doesn't matter if the unit cells are partly welded.

Fourth Embodiment

Next, a battery and its related method of a fourth embodiment according to the present invention are described in detail with reference to FIGS. 14 to 27.

Figure 14:
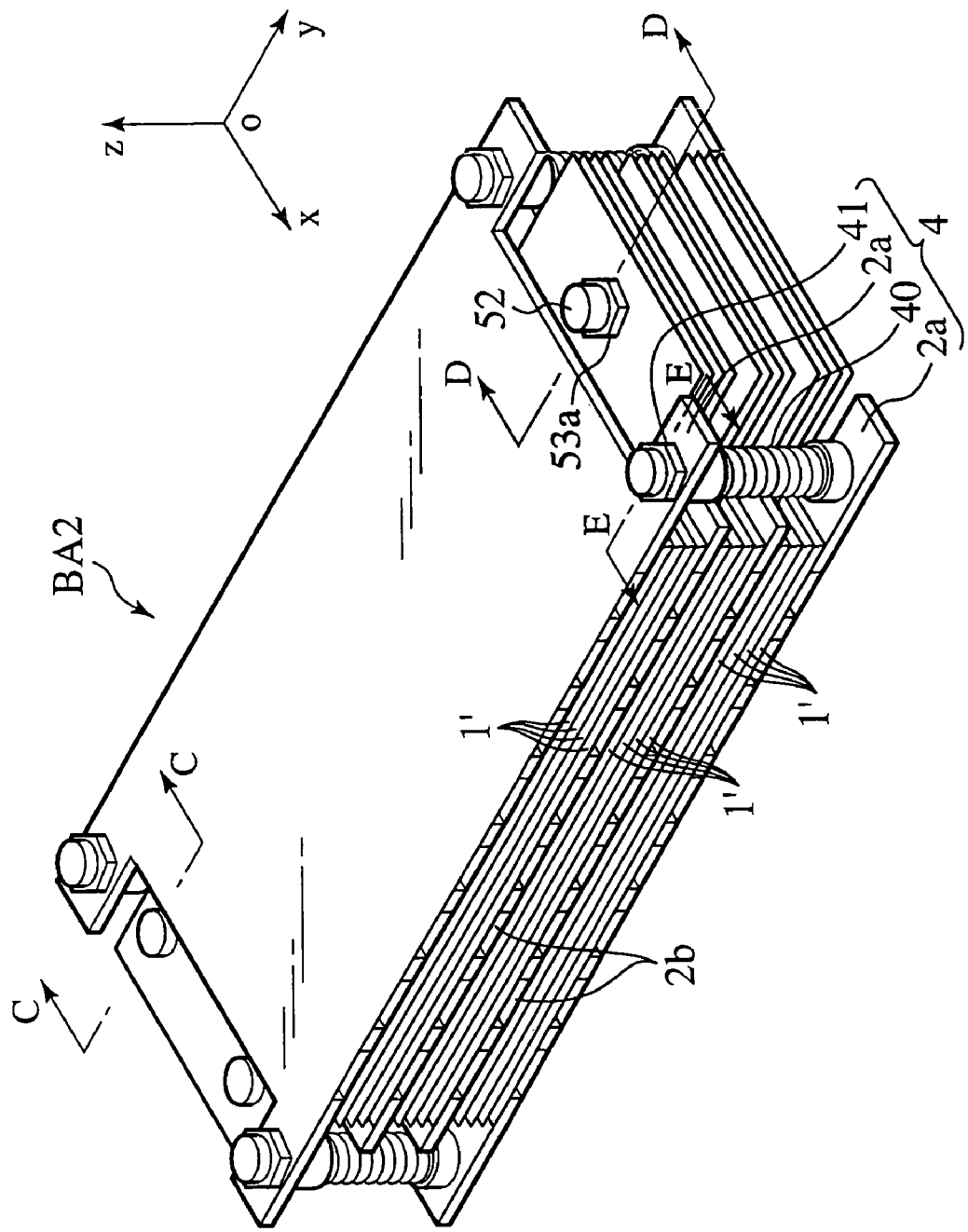
FIG. 14 is a perspective view of a battery of a fourth embodiment according to the present invention.
Figure 15A:
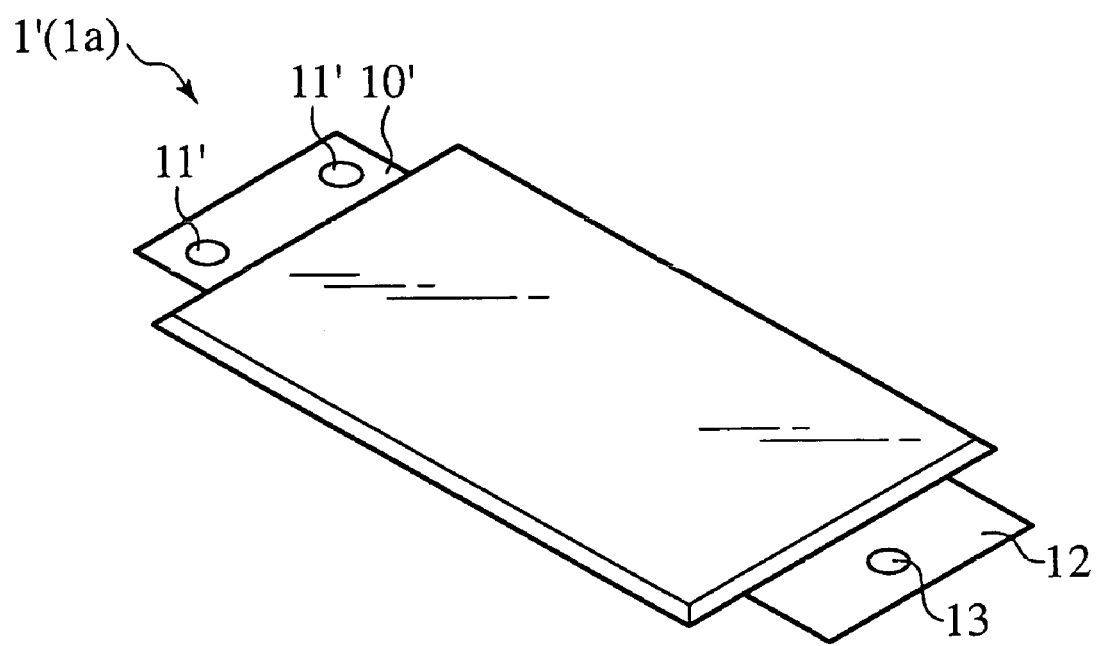
FIG. 15A is a perspective view illustrating one unit cell of the battery of the presently filed embodiment.
Figure 15B:
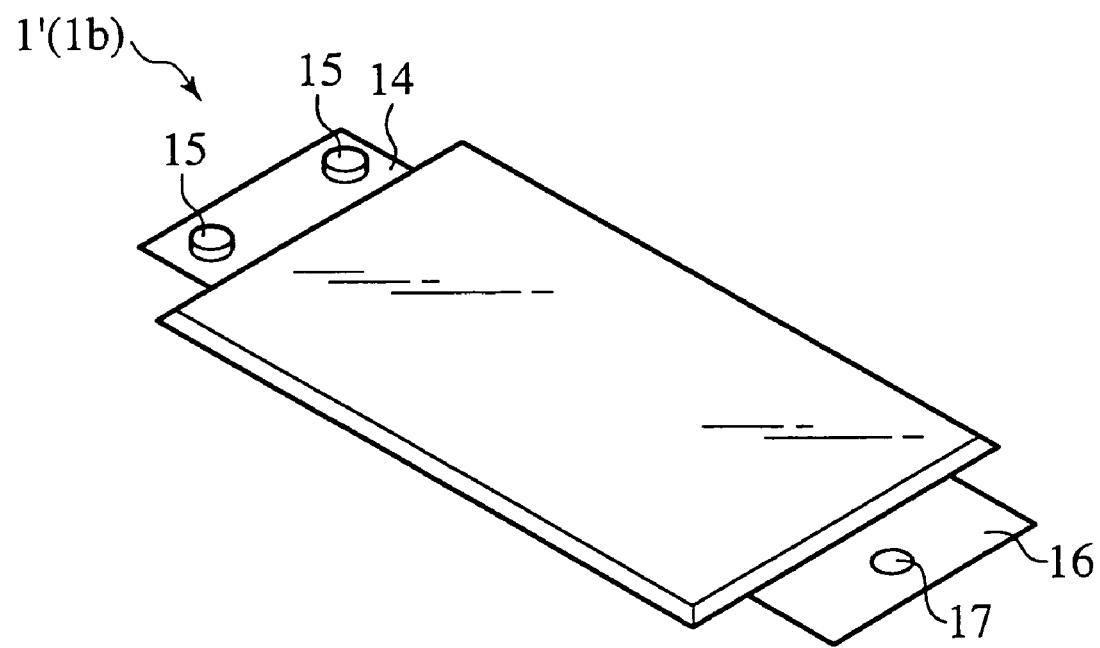
FIG. 15B is a perspective view illustrating the other unit cell of the battery of the presently filed embodiment.
Figure 16:
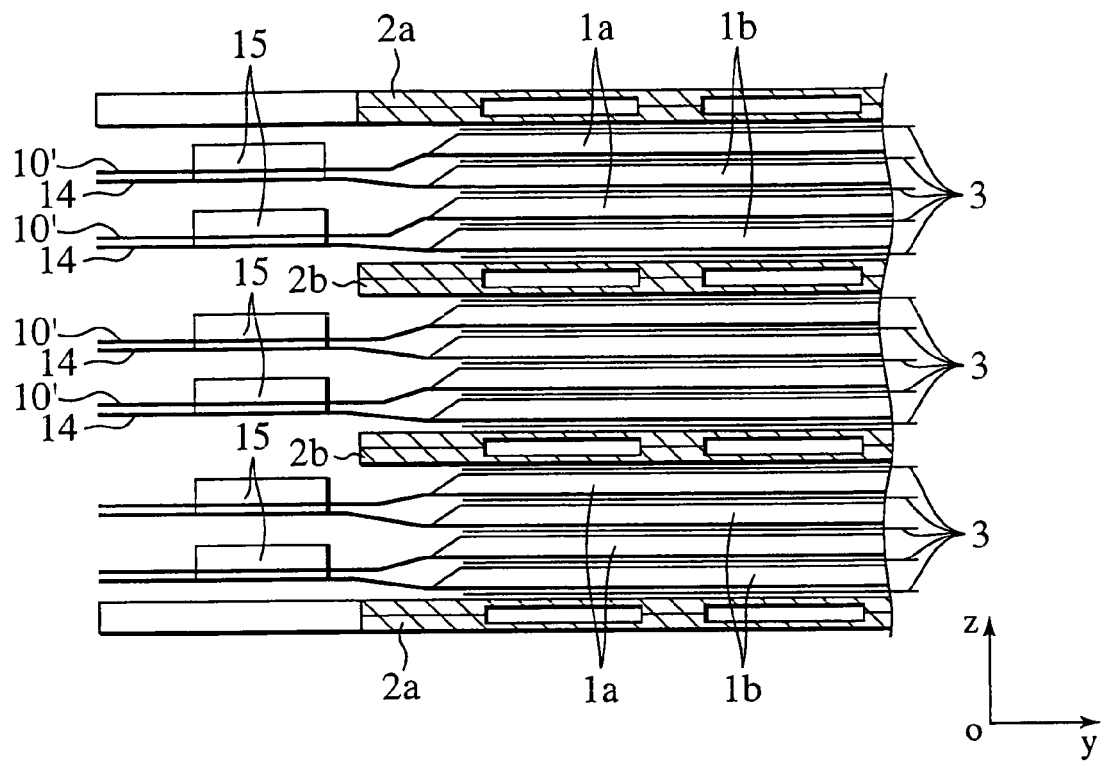
FIG. 16 is a cross sectional view taken on line C-C of FIG. 14.
Figure 17:
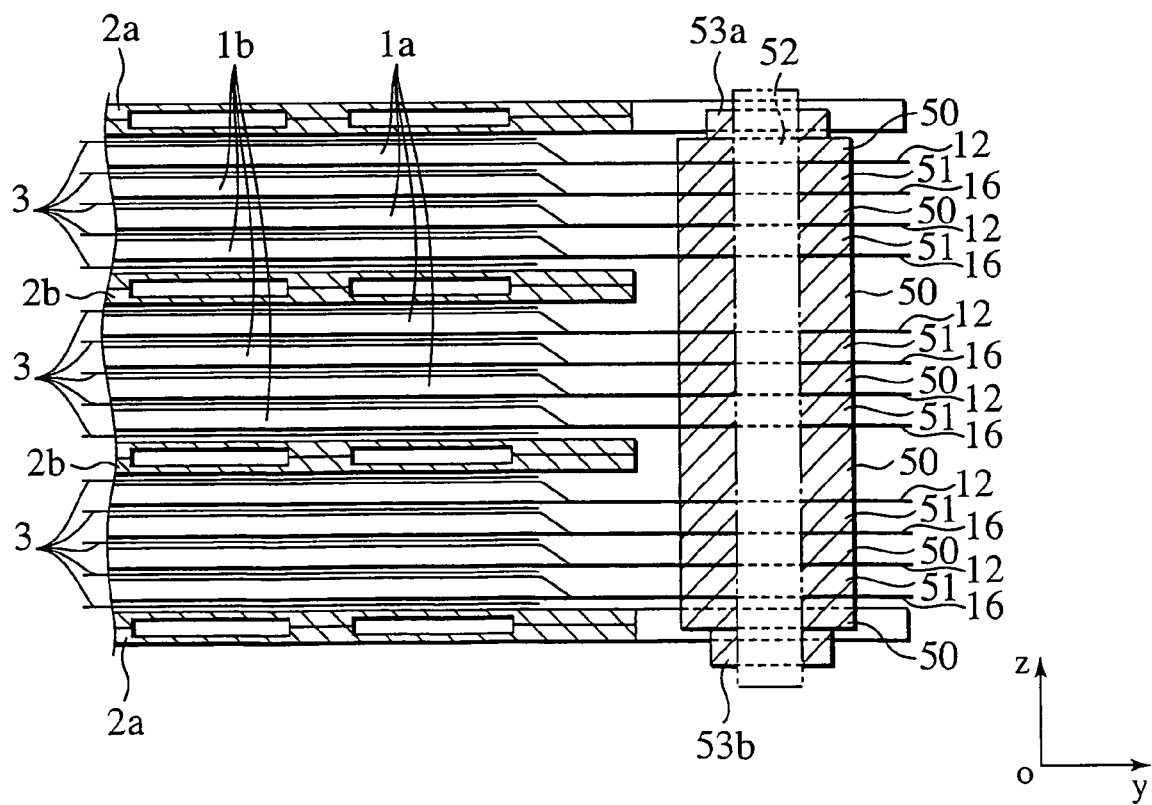
FIG. 17 is a cross sectional view taken on line D-D of FIG. 14.

FIG. 14 is a perspective view of the battery BA2 of the presently filed embodiment; FIG. 15A is a perspective view illustrating one unit cell of such a battery; FIG. 15B is a perspective view illustrating the other unit cell of the battery; FIG. 16 is a cross sectional view taken on line C-C of FIG. 14; and FIG. 17 is a cross sectional view taken on line D-D of FIG. 14.

The presently filed embodiment mainly differs from the first embodiment described above in that a unit cell 1' has a different structure, and is identical in other structure. Hereinafter, such a different point is focused in description and the same component parts as those of the first embodiment bear like reference numerals to omit or simplify description.

That is, the battery of the presently filed embodiment is comprised of a plurality of stacks of unit cells 1', the heat sinks 2a, 2b stacked with the unit cells 1', the high friction sheets 3 disposed between the unit cells 1' and between the unit cell 1' and the heat sink 2, and the holding mechanism 4 by which the plurality of stacks of unit cells 1' are pressurized at both surfaces in the stack direction to be integrally supported.

The unit cells 1' are connected in series in the stack direction. The unit cell 1' has two electrode tabs, one of which is fitted to the tab of the other unit cell 1' to be electrically and mechanically connected. Also, the other tabs are connected to one another so as to avoid short-circuiting by alternately arranging the electrically conductive washers and the insulation washers between the tabs.

Hereinafter, various component parts of the battery BA2 are described in detail also with reference to other drawings depending on needs.

<Unit Cell>

With the presently filed embodiment, as shown in FIGS. 15A and 15B, the unit 30 cell 1' includes two kinds of a unit cell 1a and a unit cell 1b.

Both the unit cells 1a, 1b are cells formed in flat shapes and any of the unit cells includes a plurality of electric power generating elements, each including a positive electrode plate, a negative electrode plate and a separator, any of which is not shown, which are stacked in this order. For the battery BA2, the unit cells 1a, 1b are stacked in the same direction as that in which the internal electric power generating elements are stacked. The internal electric power generating elements form a lithium ion battery employing gel-polymer electrolyte.

The unit cells 1a, 1b employ outer sheaths, respectively, each of which is comprised of a laminate film formed in a three-layer structure. The laminate film is formed in three layers in which an aluminum foil is sandwiched between resin films made of polyamide resin. Of the two laminate films, one sheet of laminate film is formed in a flat configuration, by press forming, that is laminated to the other sheet, remaining in a sheet shape, and thermally welded thereto at a peripheral edge.

Hermetically sealed inside the laminated laminate films are the electric power generating elements whose positive electrode tab and negative electrode tab, both serving as electrodes, are extracted outside the laminate films. The unit cells 1a, 1b have two electrode tabs, such as positive electrode tabs 10', 14 and negative electrode tabs 12, 16, which extend in a direction perpendicular to the stack direction, respectively.

The unit cell 1a has the positive electrode tab 10' and the negative electrode tab 12 one of which i.e., the positive electrode tab 10' is formed with two holes 11'. The negative electrode tab 12 is formed with one hole 13.

The unit cell 1b has the positive electrode tab 14 having two projections 15 engageable with the holes 11' of the positive electrode tab 10' of the unit cell 1a. The positive electrode tab 16 is formed with one hole 17 similar to that of the negative electrode tab 12 of the unit cell 1a.

When stacking the unit cells 1a, 1b, the holes 11' of the unit cell 1a are fitted to the associated projections 15 of the unit cell 1b. With the positive electrode tab 10' fitted to the negative electrode tab 14 of the unit cell 1b, the projections 15 of the negative electrode tab 14 protrude from the positive electrode tab 10' as shown in FIG. 16. This allows the unit cells 1a, 1b to be mutually positioned while electrically connected in series.

In the meanwhile, the negative electrode tab 12 of the unit cell 1a and the positive electrode tab 16 of the unit cell 1b are positioned and fixedly secured by permitting the electrically conductive washer 50 or the insulation washer 51 to be sandwiched between the other tabs 12, 16 to allow the locating pin 52 to extend through the washers as shown in FIG. 17.

The electrically conductive washer 50 forms a part of component parts by which the battery is manufactured and is formed of an electrically conductive member, with a temporary insulator, which is made of electrically conductive metal such as copper or aluminum to allow the electrode tabs 16, 12, set on top and bottom surfaces of the washer 50, to be electrically connected. The insulation washer 51 is formed of insulating metal such as ceramic to electrically insulate the tabs 12, 16, set on top and bottom surfaces of the washer 51, from one another. The electrically conductive washer 50 and the insulation washer 51 serve as spacers to avoid direct contact between the electrode tabs 12, 16 of the adjacent unit cells 1'.

For the battery BA2, the insulation washer 51 is interposed between the positive electrode tab 16 of one unit cell 1b and the negative electrode tab 12, placed above the positive electrode tab 16, of the other unit cell 1a. This is based on consideration in that for a tier where the unit cell 1a is set on the unit cell 1b, the negative electrode tab 14 of the unit cell 1b and the positive electrode tab 10' of the unit cell 1a are fitted to one another to be mechanically and electrically connected, as shown in FIG. 16, and if the positive electrode tab 16 and the negative electrode tab 12, placed thereon, are electrically connected, causing short-circuiting. In the meanwhile, the electrically conductive washer 50 is interposed between the negative electrode tab 12 of the unit cell 1a and the positive electrode tab 16 of the unit cell 1b placed thereon.

As set forth above, with the structure of the presently filed embodiment, the electrically conductive washers 50 and the insulation washers 51 are alternately arranged such that for the tier where the unit cells 1a, 1b are mechanically and electrically connected at the electrode tabs 10', 14, the electrode tabs 12, 16 on opposite side are electrically insulated from one another by the insulation washer 51, whereas in contrast, for the tier where no electrode tabs 10', 14 are electrically connected, the electrode tabs 12, 16 are electrically connected by the electrically conductive washer 50, thereby permitting the unit cells 1a and the unit cells 1b to be connected in series in the stack direction.

The locating pin 52 is subjected to insulation treatment by coating a surface of a metallic bar with resin or by covering the surface of the metallic bar with resin. Tightening nuts 53a, 53b onto the locating pin 52 at top and bottom ends thereof causes the electrode tabs 12, 16 of the unit cell 1' to be firmly sandwiched between the electrically conductive washer 50 and the insulation washer 51. Consequently, the electrode tabs 12, 16 are electrically connected to one another or insulated from one another in a reliable manner.

Incidentally, the nuts 53a, 53b may be utilized to fasten electrode terminals (not shown) for extracting electric power from the battery like in the first embodiment.

<Heat Sink, High Friction Sheet and Holding Mechanism>

The heat sink 2a, 2b, the high friction sheet 3 and the holding mechanism 4 fundamentally have the same structure as that of the first embodiment.

In particular, the heat sinks include two kinds of outer layer heat sinks 2a and inner layer heat sinks 2b that are stacked with the unit cells 1' in a middle of the battery, and any of the heat sinks is formed with a ventilation passages 20 available for coolant, such as air, to flow through.

The outer layer heat sinks 2a are formed with cutouts 21, respectively, to allow the electrode tabs 10' 12, 14, 16 of the stacked unit cells 1' to be exposed and have four corners formed with holes 22, respectively, between two of which the cutout 21 is intervened. The inner layer heat sink 2b is disposed between the unit cells 1' in such a way that when four sheets of unit cells 1' are stacked, one sheet of inner layer heat sink 2b is placed on top of the four sheets as shown in FIGS. 16 and 17.

The high friction sheet 3 is made of silicone rubber that is formed in a sheet configuration to be interposed between the unit cells 1' or between the unit cell 1' and the heat sink 2, thereby precluding transverse displacements of these component elements.

The holding mechanism 4 includes the outer layer heat sink 2a to be stacked on the outermost layer, the pressurizing units 40 to be disposed between the outer layer heat sinks 2a, and the nuts 41 by which the pressurizing units 40 are mounted to the outer layer heat sinks 2a, and elastic forces exerted by the tension coil springs (resilient bodies) 42 of the pressurizing units 40 act on the unit cells 1' through the outer layer heat sinks 2a to form a pressurizing force.

<Assembling Procedure>

Now, description is made of assembling procedure for the battery BA2 of the presently filed embodiment with the structure mentioned above.

Figure 18:
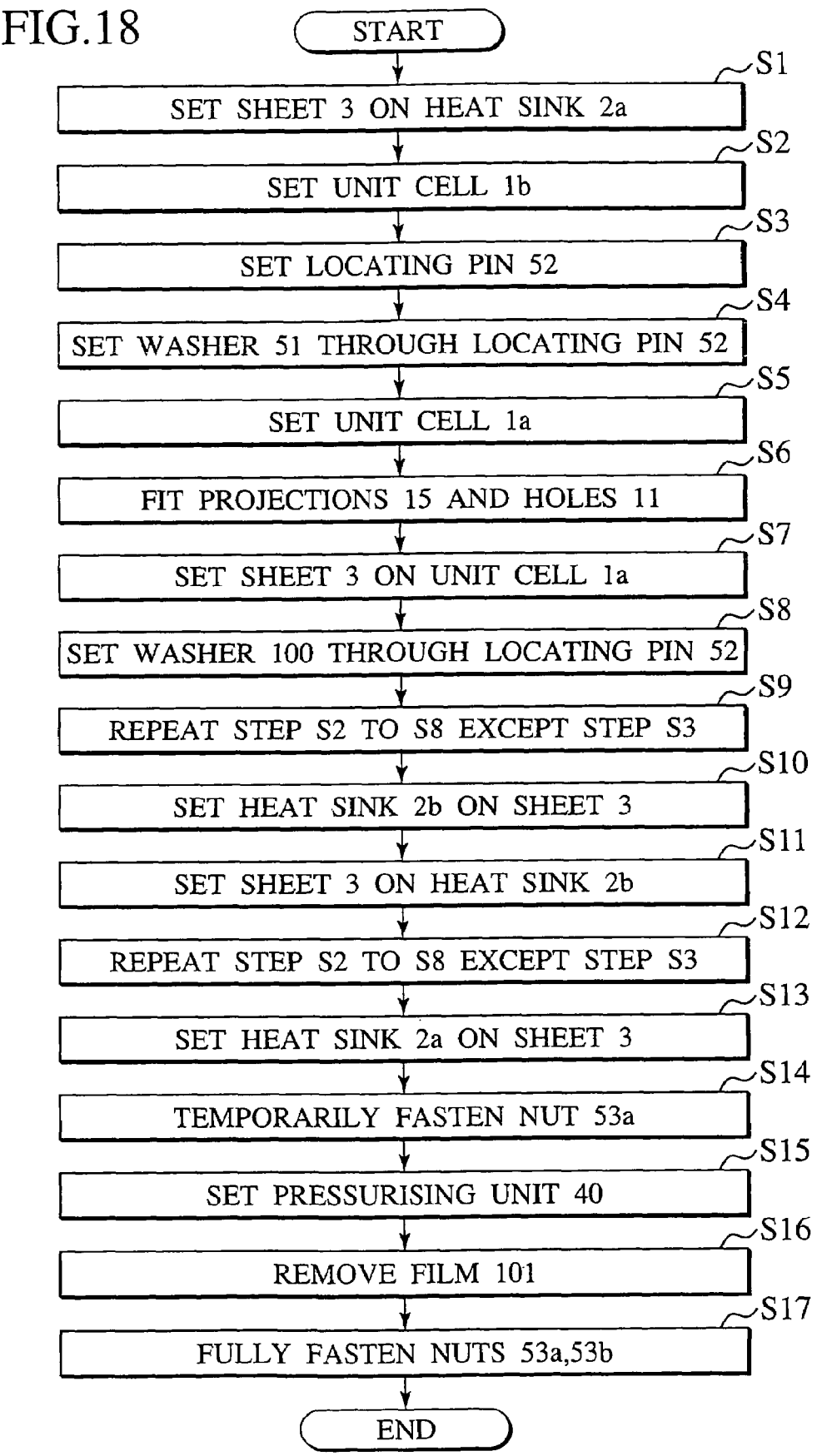
FIG. 18 is a flowchart illustrating assembling procedure of the battery of the presently filed embodiment.
Figure 19:
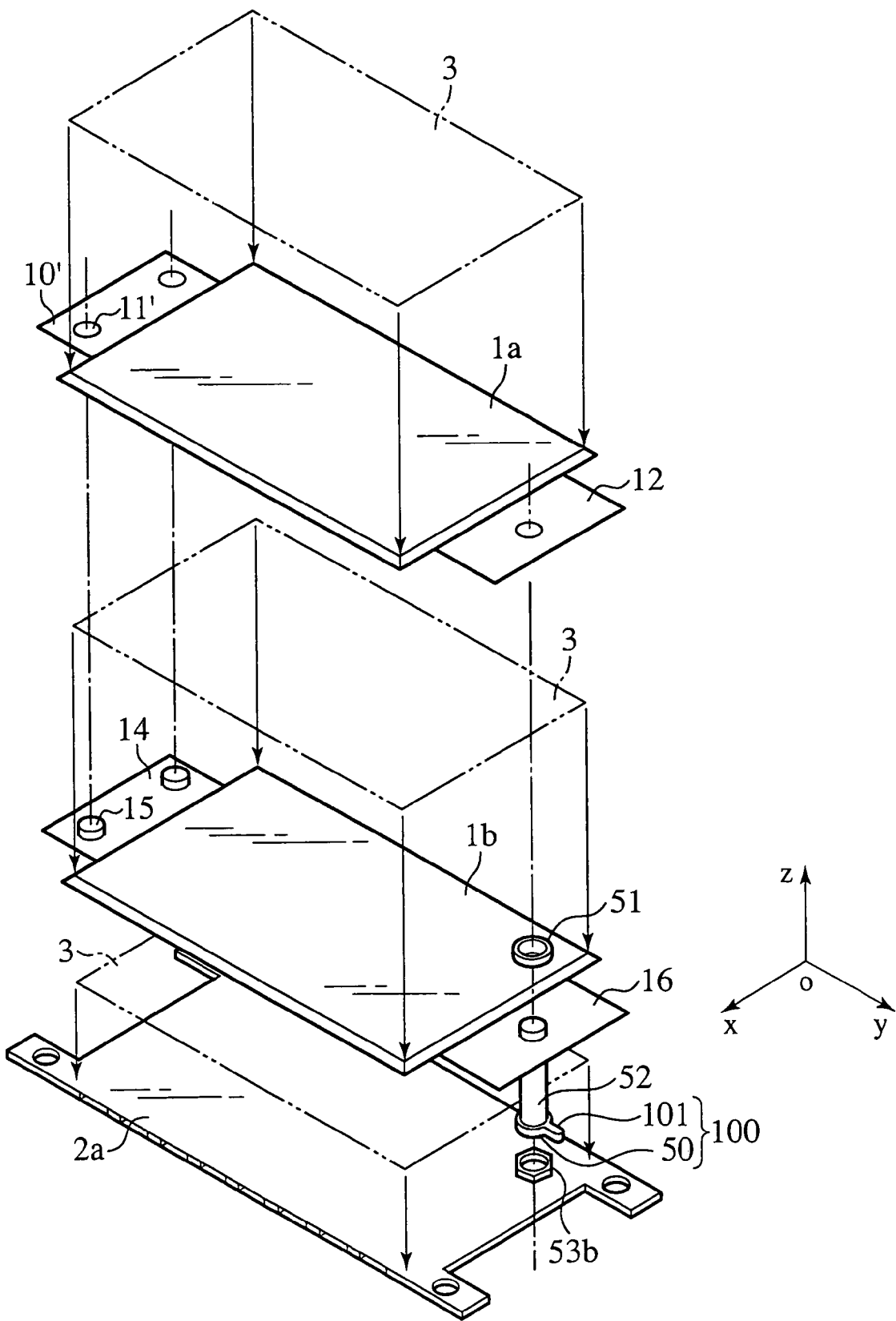
FIG. 19 is an exploded perspective view for illustrating assembling procedure of the battery of the presently filed embodiment.
Figure 20:
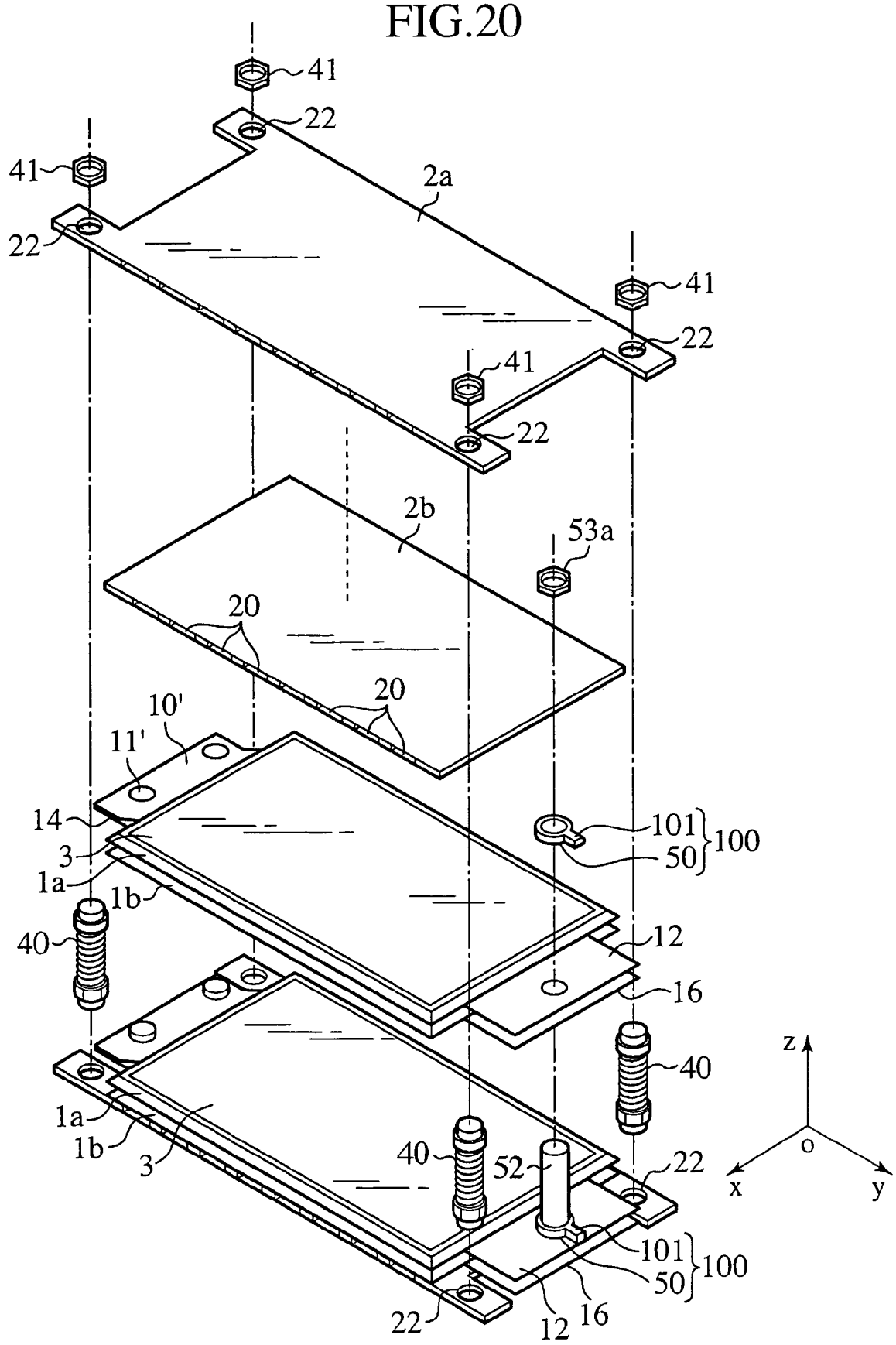
FIG. 20 is an exploded perspective view for illustrating assembling procedure followed from a condition shown in FIG. 19.

FIG. 18 is a flowchart illustrating a basic sequence of assembling the battery BA2 of the presently filed embodiment; FIG. 19 is an exploded perspective view illustrating a basic sequence of assembling the battery BA2; and FIG. 20 is an exploded view illustrating a basic sequence of assembling the battery BA2 consecutive to a condition shown in FIG. 19. Incidentally, the sequence of steps S1 to S6 of FIG. 18 will be suitably understood with reference to FIG. 19, and the sequence of steps S7 to S17 will be suitably understood with reference to FIG. 20. First, as shown in FIGS. 18 and 19, the high friction sheet 3 is set on the outer layer heat sink 2a (step S1).

Next, the unit cell 1b is set on the high friction sheet 3 placed on the outer layer heat sink 2a (step S2) and the locating pin 52 is inserted to the electrode tab 16, whereupon the locating pin 52 is temporarily fastened by the nut 53b through the electrically conductive washer 50, disposed outside the electrode tab 16, and more particularly, through an electrically conductive washer 100 with an insulation film to set the locating pin (step S3). Incidentally, the locating pin 52 has both ends formed with thread ridges to screw the nuts 53a, 53b.

Subsequently, the insulation washer 51 is set through the locating pin 52 (step S4), and the unit cell 1a is set on the unit cell 1b (step S5).

Consecutively, the projections 15 of the negative electrode tab 14 of the unit cell 1b are fitted to the holes 11 of the positive electrode tab 10 of the unit cell 1a (step S6). This allows the unit cells 1a, 1b to be united.

Next, the high friction sheet 3 is set on the unit cell 1a (step S7).

Subsequently, further as shown in FIG. 20, the electrically conductive washer 100 with the insulation film is set on the electrode tab 12 of the unit cell 1a through the locating pin 52 (step S8).

Here, repeating steps S2 to S8 except step S3 allows a given number of sets of double unit cells 1a, 1b to be stacked (step S9).

Consecutively, after the given number of unit cells 1a, 1b have been finally stacked, the inner layer heat sink 2b is set on the high friction sheet 3 (step S10).

Subsequently, the high friction sheet 3 is also set on the inner layer heat sink 2b (step S11).

Here again, repeating steps S2 to S8 except step S3 allows (step S2 to S11 except step S3 when setting the inner layer heat sinks 2b in multiple layers) allows the given number of unit cells 1a, 1b, with the double sheet in one set, to be stacked (step S12).

Thus, after repeatedly, stacking the given number of unit cells 1a, 1b and the inner layer heat sinks 2b, an upper outer layer heat sink 2a is set on the high friction sheet 3 of the uppermost unit cell 1a (step S13).

The nut 53a is temporarily fastened to a top of the locating pin 52 (step S14). Here, by the term "temporarily fastened" is meant the extent in which the nut is screwed not to cause the electrode tabs 12 and 16 of the plural unit cells 1a, 1b, stacked on assembly, to remove from the locating pin 52.

Now, the electrically connecting relationship between the unit cells 1a, 1b is studied.

Figure 21:
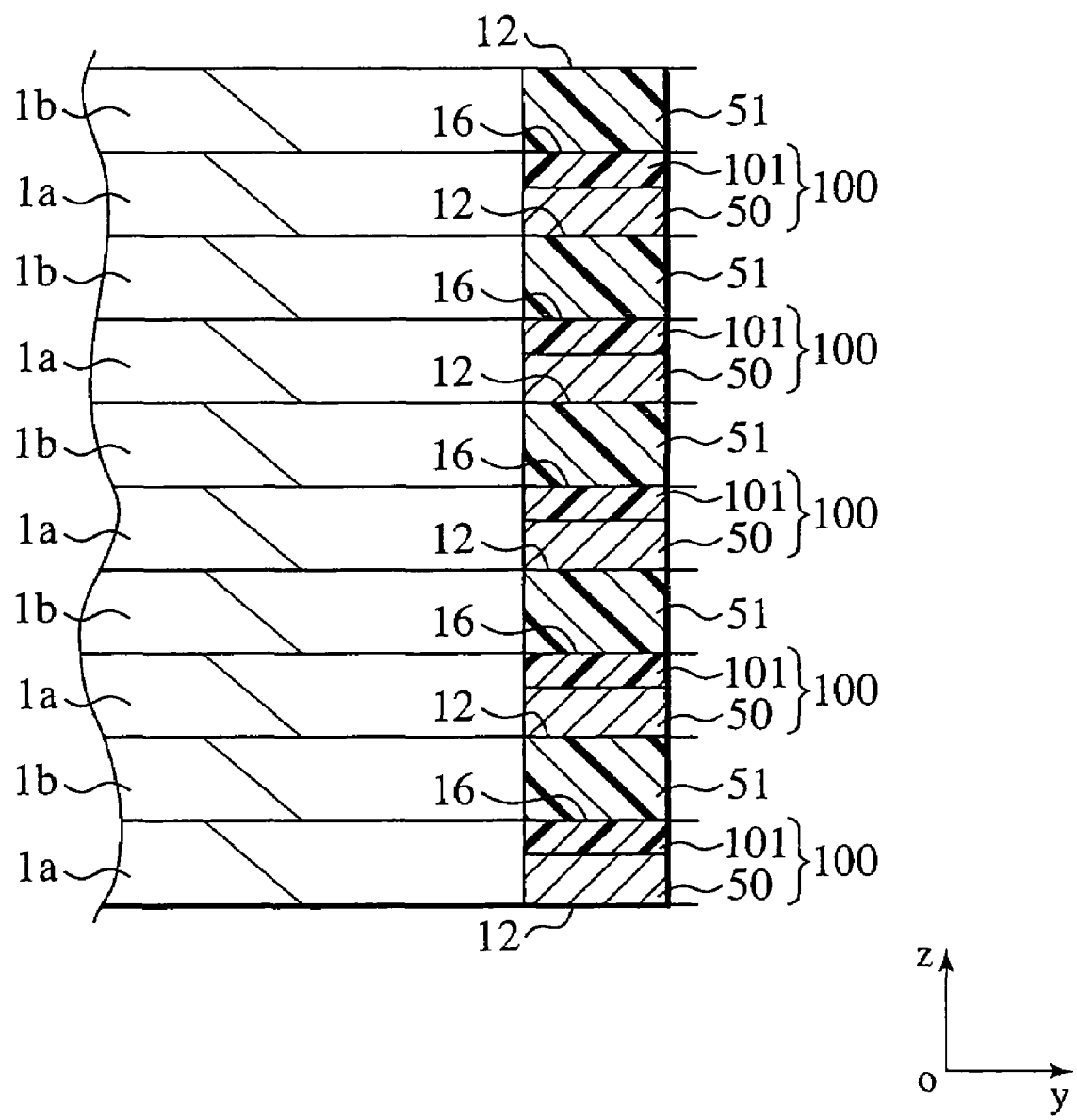
FIG. 21 is a typical view illustrating a condition wherein insulation washers and electrically conductive washers with insulation films are set in the presently filed embodiment.

FIG. 21 is a typical view illustrating a stacked condition where the insulation washers 51 and the electrically conductive washers 100 each with the insulation film are located. Also, in the drawing figure, the heat sinks are omitted.

As shown in FIG. 21, a stack body has areas in which the insulation washers 51 and the electrically conductive washers 100 with the insulation films 101 are located to cause all the electrode tabs 12, 16 to remain in completely insulated conditions with all the unit cells 1a, 1b being assembled. That is, the insulation washer 51 provides insulation between the tabs 12 and 16 of the one set of the unit cells 1a, 1b in double sheets that are connected on the electrode tabs 10', 14, and the electrically conductive washer 100 with the insulation film 101 results in insulation between the electrode tabs 12 and 16 related to the other set of unit cells.

Further, description is made of a structure to be taken by the electrically conductive washer with the insulation film.

FIG. 22A is a plan view illustrating one example of the electrically conductive washer with the insulation film, and FIG. 22B is a cross sectional view taken on line F-F of FIG. 22A.

As shown in FIGS. 22A and 22B, the electrically conductive washer 100A with the insulation film has a structure in which an annular insulation film 101, similar to the electrically conductive washer 50, is adhered onto the electrically conductive washer 50 made of copper or aluminum. Here, examples of the insulation film 101 may include resin films, such as a polyethylene film and vinyl film, or paper sheets.

FIG. 22C is a plan view illustrating another example of an electrically conductive washer with an insulation film, and FIG. 22D is a cross sectional view taken on line G-G of FIG. 22C.

As shown in FIGS. 22C and 22D, the electrically conductive washer 100B with the insulation film takes the form of a structure wherein the annular insulation film 101, shown in FIGS. 22A and 22B, additionally has a pickup tag 102 that protrudes in a radial direction of the annulus outward from the electrically conductive washer 50. The provision of such a pickup tag 102 allows the pickup tag 102 to be pulled out when desired to remove the insulation film 101 depending on needs for thereby enabling the same to be simply removed.

FIG. 22E is a plan view of another example of an electrically conductive washer with an insulation film, and FIG. 22F is a cross sectional view taken on line H-H of FIG. 22E.

As shown in FIGS. 22E and 22F, the electrically conductive washer 100C with the insulation film takes the form of a structure wherein the insulation film 101 formed with the pickup tag, shown in FIGS. 22C and 22D, is additionally formed with a slit 103 at a position in opposition to the pickup tag 102. The provision of such a slit 103 allows the insulation film 101 to be torn at an area near the slit 103, when removing the insulation film 101 depending on needs, for thereby providing a further ease of removal. When forming such a slit 103, a need arises to pay attention not to cause the area near the slit 103 to be electrically conductive, that is, not to cause an exposure rate of the electrically conductive washer 50 to increase. Also, the slit 103 may be replaced with perforation, resulting in similar effects.

Of course, the pickup tag, slit and perforations set forth above may be mutually combined in various forms. The insulation film may be formed with the slit or perforation with no formation of the pickup tag, or may be formed with the perforation together with the slit. Or, additionally, slits and perforations may be located at plural positions.

By the way, after the component elements, such as the unit cells 1a, 1b, are stacked in assembly up to step S14 and the nut 53a is temporarily fastened to the top of the locating pin 52, the pressurizing units 40 are set between the outer layer heat sinks 2a and the nuts 41 are fastened until the coil springs 42 of the pressurizing units 40 extend by a given length for thereby fastening the pressurizing units 40 (step S15).

Subsequently, all the insulation films 101 are removed from above the electrically conductive washers 50 (step S16). At this stage, since the locating pin 52 is merely fastened, the insulation films 101 can be easily removed.

Finally, the nuts 53a, 53b on both sides of the locating pin 52 are fully fastened and tightened by a given torque to fasten the electrode tabs 12, 16 in finish (step S17). This allows the electrically conductive washers 50 to be fully brought into contact with the electrode tabs 12 and 16, by which the electrically conductive washers 50 is sandwiched, to connect all the unit cells 1a, 1b in series, providing an assembly of the battery BA2 shown in FIG. 14.

With the structure of the presently filed embodiment set forth above, since the battery is assembled under a condition where the insulation films are placed on the electrically conductive washers through which the plurality of unit cells are connected in series, a total voltage of the unit cells connected in series during assembly just lies in a value (a total value of approximately 8 volts if the voltage of one unit cell is about 4 volts) equal to voltages of two unit cells at the highest, resulting in a capability of reliably and simply performing assembling work.

<Modified Form of Electrically Conductive Washer>

Hereinafter, a further modified form of the electrically conductive washer of the presently filed embodiment is described.

Figure 23A:
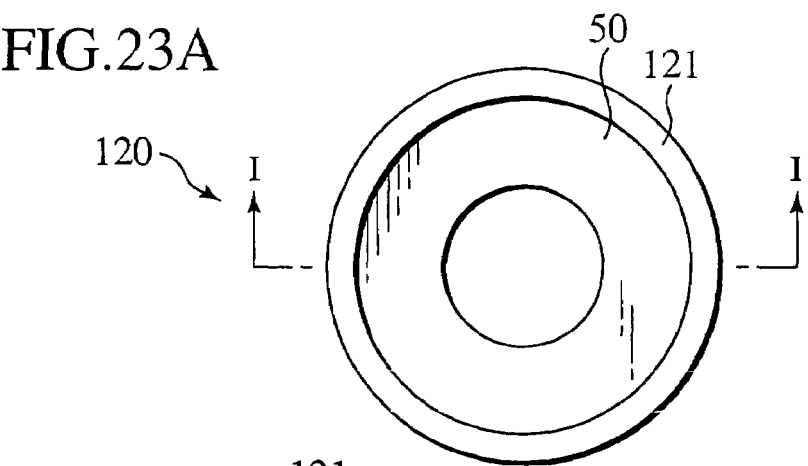
FIG. 23A is a plan view illustrating one example of an electrically conductive washer with a temporary insulator in the presently filed embodiment.
Figure 23B:
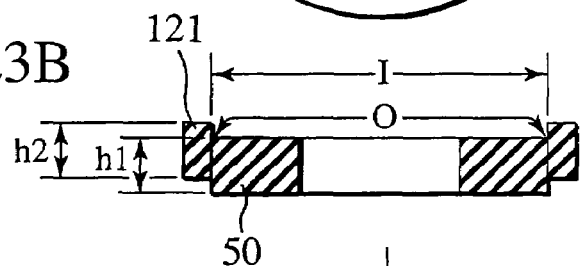
FIG. 23B is a cross sectional view taken on line I-I of FIG. 23A showing a condition prior to a locating being tightened.

FIG. 23A is a plan view illustrating one example of an electrically conductive washer with a temporary insulator; FIG. 23B is a cross sectional view taken on line I-I of FIG. 23A illustrating a condition prior to the fastening of the locating pin; and FIG. 23C is a cross sectional view taken on line I-I of FIG. 23A illustrating a condition subsequent to the fastening of the locating pin.

Figure 23C:
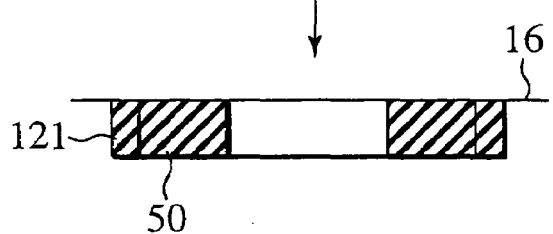
FIG. 23C is a cross sectional view taken on line I-I of FIG. 23A showing another condition subsequent to the locating being tightened.

As shown in FIGS. 23A to 23C, the electrically conductive washer 120 with the temporary insulator has an insulating ring 121 as a temporary insulator that has an inner diameter I slightly smaller than an outer diameter O of the electrically conductive washer 50 and a thickness h2 slightly less than a thickness h1, along a direction between the electrode tabs, of the electrically conductive washer 50. The insulating ring 121 protrudes from the electrically conductive washer 50, under a condition prior to the fastening of the locating pin, as shown in FIG. 23B, and the electrode tabs 12 and 16 are held in an insulated condition. In the meantime, after the locating pin is fastened, the insulating ring 121 is retracted toward the electrically conductive washer due to a compression force caused by fastening, as shown in FIG. 23C, and the electrode tabs 12 and 16 are held in an electrically conductive condition.

Incidentally, the inner diameter I of the insulating ring is determined to have a size affording a frictional force to the extent not to cause the insulating ring to readily drop off from the electrically conductive washer during a state prior to the locating pin being fastened and to allow the insulating ring to slide on the electrically conductive washer due to a fastening force applied to the locating pin. Moreover, the thickness h2 of the insulating ring 121 is suffice to have a thickness less than the electrically conductive washer 50 not to cause the insulating ring to project from the electrically conductive washer 50 when the locating pin is fastened. Also, raw materials for the insulating ring 121 may include plastic or ceramic with insulation property.

Figure 24A:
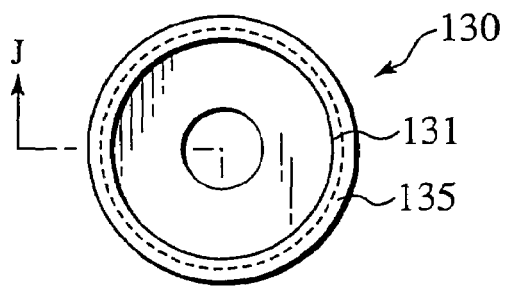
FIG. 24A is a plan view illustrating another example of an electrically conductive washer with a temporary insulator in the presently filed embodiment.
Figure 24B:
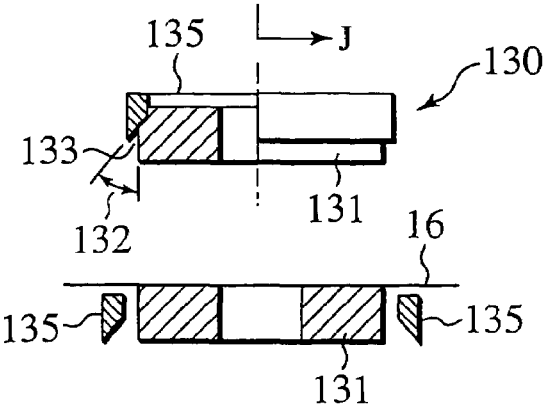
FIG. 24B is a cross sectional view taken on line J-J of FIG. 24A showing a condition prior to the locating being tightened.
Figure 24C:
FIG. 24C is a cross sectional view taken on line J-J of FIG. 24A showing another condition subsequent to the locating being tightened.

FIG. 24A is a plan view illustrating another example of an electrically conductive washer with a temporary insulator; FIG. 24B is a cross sectional view taken on line J-J of FIG. 24A illustrating a condition prior to the fastening of the locating pin; and FIG. 24C is a cross sectional view taken on line J-J of FIG. 24A illustrating a condition subsequent to the fastening of the locating pin. As shown in FIGS. 24A to 24C, the electrically conductive washer 130 with the temporary insulator is comprised of an annular electrically conductive washer 131 with an outer annular shoulder formed with a taper 132, and an annular insulating ring 135, having a tapered support 133 held in contact with the taper 131 to be supported, that has an inner diameter less than the outer diameter of the electrically conductive washer 131 and protrude from the electrically conductive washer 131. Here, the insulating ring 135 may be preferably made of relatively fragile material such as ceramic or hard plastic.

The insulating ring 135 protrudes from the electrically conductive washer 131, as shown in FIG. 24B, under a condition where the locating pin is fastened, the electrode tabs 12 and 16 are held in an insulated condition. In the meanwhile, as shown in FIG. 24C, when the locating pin is fastened, a compression force caused by the fastening results in a force to cause the tapers 132, 133 to expand the insulating ring 135 outward, which is consequently ruptured. Accordingly, fastening the locating pin automatically causes the insulating rind 135 to remove from the electrically conductive washer 131, causing the electrode tabs 12 and 16 to be held in an electrically conductive condition. Incidentally, the insulating ring 135 may be altered such that instead of causing the insulating ring 135 to be ruptured, the insulating ring 135 expands in diameter along the tapers when the locating pin is fastened to allow the insulating ring 135 to slip toward the electrically conductive washer 131 due to a force resulting from the fastening for thereby removing the insulating property.

Figure 25A:
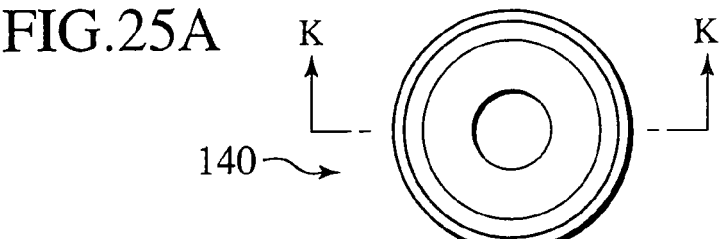
FIG. 25A is a plan view illustrating still another example of an electrically conductive washer with a temporary insulator in the presently filed embodiment.
Figure 25B:
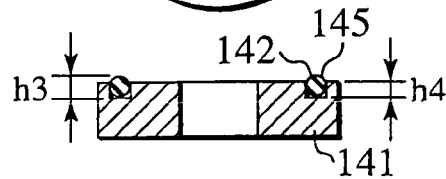
FIG. 25B is a cross sectional view taken on line K-K of FIG. 25A showing a condition prior to the locating being tightened.

FIG. 25A is a plan view illustrating still another example of an electrically conductive washer with a temporary insulator; FIG. 25B is a cross sectional view taken on line K-K of FIG. 25A illustrating a condition prior to the fastening of the locating pin; and FIG. 25C is a cross sectional view taken on line K-K of FIG. 25A illustrating a condition subsequent to the fastening of the locating pin.

Figure 25C:
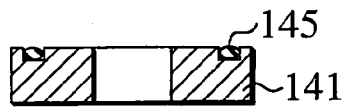
FIG. 25C is a cross sectional view taken on line K-K of FIG. 25A showing another condition subsequent to the locating being tightened.

As shown in FIGS. 25A to 25C, the electrically conductive washer 140 with the temporary insulation means is comprised of an electrically conductive washer 141 formed with an annular concave recess 142, and an insulating ring 145, made of elastic material, and disposed in the concave recess 142. The insulating ring 145 is formed to have a thickness h3 greater than a depth h4 of the concave recess 142 under a normal condition and a volume less than that of the concave recess 142.

The insulating ring 145 made of such material projects from the electrically conductive washer 141, as shown in FIG. 25B, under a condition prior to the fastening of the locating pin and, hence, the electrode tabs 12 and 16 are held in an insulated condition. In the meanwhile, as shown in FIG. 25C, when the locating pin is fastened, a compression force resulting from the fastening collapses the insulating ring 141 to cause the electrically conductive washer 141 to provide electrical conductance between the electrode tabs 12 and 16.

Figure 26:
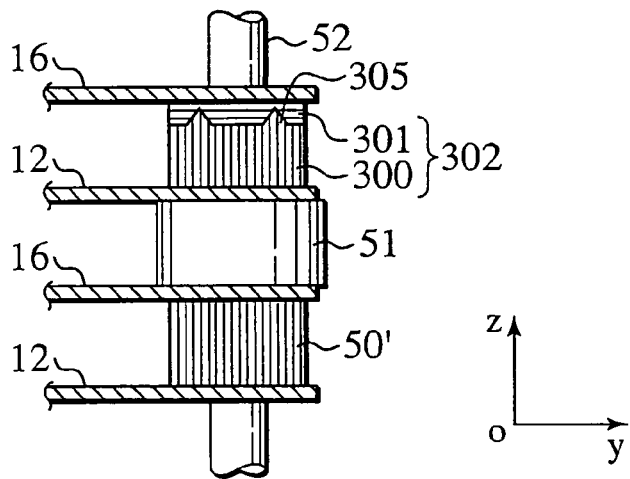
FIG. 26 is a schematic cross sectional view illustrating still another example of an electrically conductive washer with a temporary insulator in the presently filed embodiment.
Figure 27:
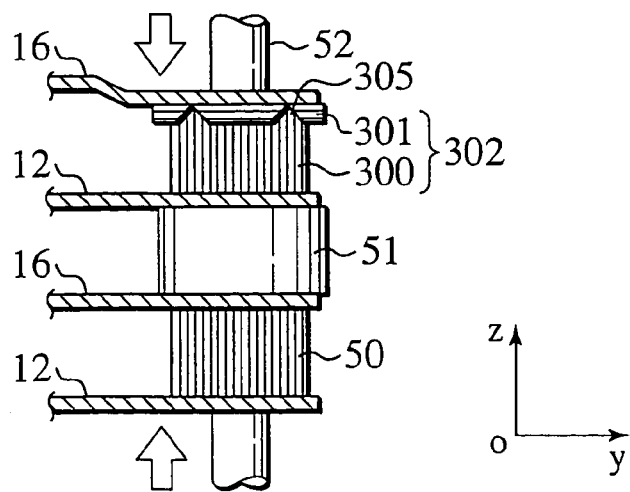
FIG. 27 is a view showing a condition of the electrically conductive washer with the temporary insulator shown in FIG. 26 after the locating pin is tightened in the presently filed embodiment.

FIG. 26 is a schematic cross sectional view illustrating a further example of an electrically conductive washer with a temporary insulator and showing a state prior to the fastening of the locating pin, and FIG. 27 shows a state of the electrically conductive washer with the temporary insulator, shown in FIG. 26, subsequent to the fastening of the locating pin.

As shown in FIGS. 26 and 27, the electrically conductive washer 302 with the temporary insulator takes the form of a structure wherein an elastic sheet 301 is placed to overlap an electrically conductive washer 300. The electrically conductive washer 300 has a surface, on which the elastic sheet 301 is placed, formed with an electrically conductive protrusion 305. In the meanwhile, the elastic sheet 301 forms a temporary insulator that is made of material, with an insulating property and an elasticity, including a member of rubber system such as synthetic rubber or silicone rubber.

The electrically conductive washer 302 with the temporary insulator remains in an insulated condition with the protrusion 305 being inoperative to smash through the elastic sheet 301 under a condition prior to the fastening of the locating pin 52 as shown in FIG. 26. On the other hand, under a condition where the nuts 53 are fastened to the locating pin 52 up and down, the elastic sheet 301 is compressed, as shown in FIG. 27, to cause the protrusion 305 formed on the electrically conductive washer 300 to smash through the insulation sheet, thereby allowing the electrically conductive washer 300 to be brought into contact with the electrode tab 16.

Accordingly, during assembly of the battery, the stacked unit cells are electrically insulated and no series connection is provided among all the unit cells, and all the unit cells are brought into series connection at a timing in which the nuts 53 fasten the locating pin 52 up and down in a final stage.

Incidentally, with such a structure, it is possible to realize a structure wherein suitable selection of an elasticity of the elastic sheet 300 allows the elastic sheet to restore in an original position again to conceal the protrusion upon release of the fastening force subsequent to the phase of fastening the locating pin 52 up and down through the nuts 53, an area near the protrusion is insulated to shut off connection between the plural unit cells that are stacked.

Further, with the electrically conductive washers 120, 130, 140, 302 with the temporary insulators, since fastening the locating pin 52 automatically causes the electrode tabs 12 and 16 to be brought into an electrically conductive state and, among the assembling sequence of the battery set forth above, the assembling sequence needs no step (step S16) of removing the insulating film.

<Other Form of Manufacturing Procedure>

Finally, other form of assembling procedure for the battery of the presently filed embodiment is described.

Figure 28:
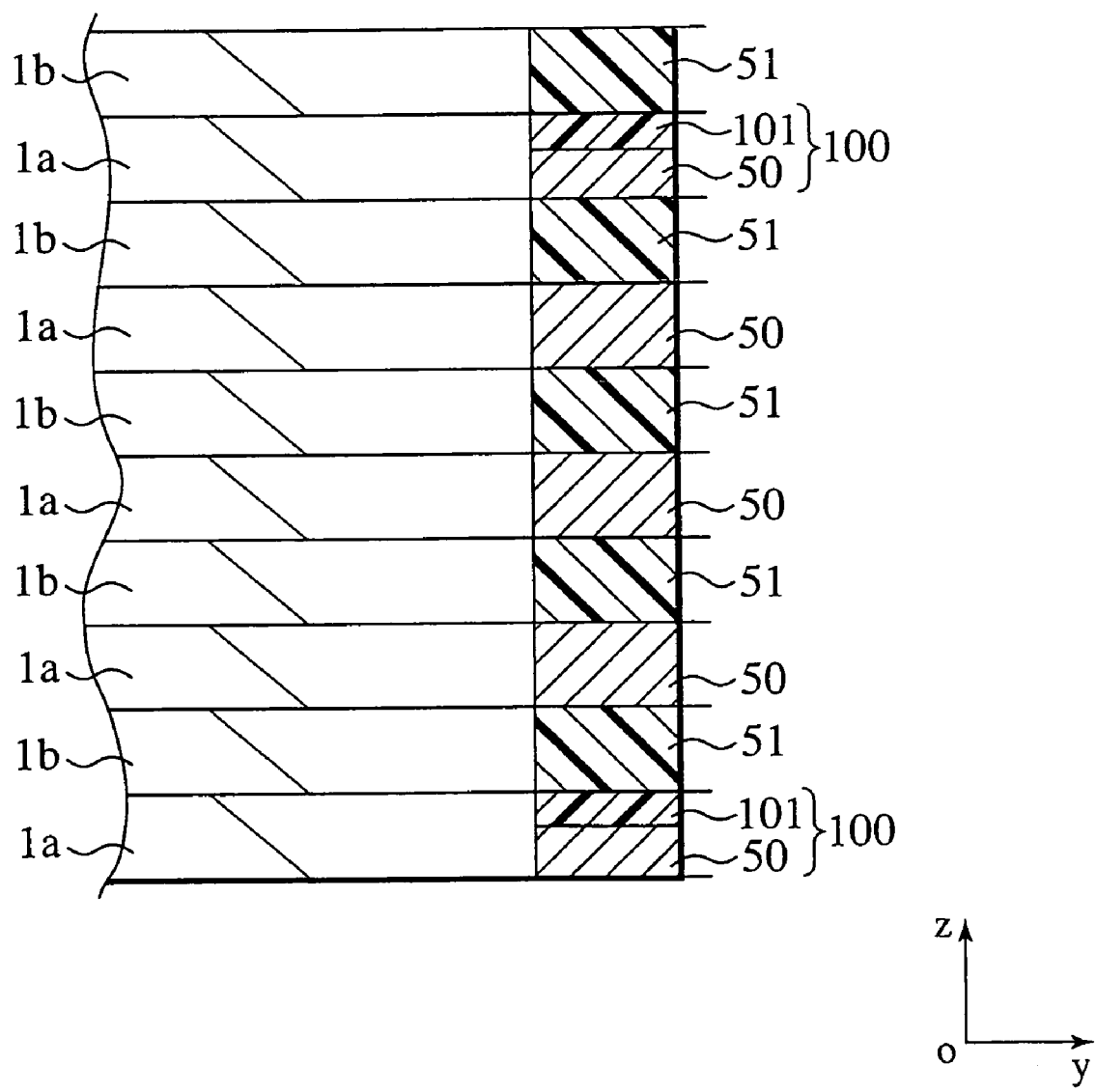
FIG. 28 is a typical view illustrating another example wherein the insulation washers and the electrically conductive washers with the insulation films are set in the presently filed embodiment.

FIG. 28 is a typical view illustrating a condition of other example where an insulation washer and an electrically conductive washer with an insulation film are set.

Although in the manufacturing process of the battery set forth above mainly with reference to FIG. 18, all the electrically conductive washers are used which include the insulation films, it may be possible to locate one electrically conductive washer for a plurality of unit cells connected in series.

That is, as shown in FIG. 28, it may be possible to provide a structure that employs one electrically conductive washer 100 with the insulation film for a given number of unit cells, i.e., eight pieces of unit cells in the drawing figure. The reason why one electrically conductive washer 100 with the insulation film is used for the plural unit cells resides in that for one unit cell with a voltage of 4 volts, the presence of the unit cells connected in series with the number of pieces less than ten pieces provides an output voltage that has a value less than 40 volts to ensure a reliability on work and, as shown, the presence of one piece of electrically conductive washer 100 with the insulation film being interposed for eight pieces of unit cells results in a capability of realizing the reliability on such work.

In such a way, interposing one electrically conductive washer 100 with the insulation film to allow the unit cells, connected in series, to typically have a voltage less than 40 volts ensures the reliability on work and reduces the number of insulation films, thereby enabling reduction in a number of man-hour per se in removing the insulation films that would otherwise occur due to the use of the electrically conductive washer 100 with the insulation film.

The battery discussed above with reference to the fourth embodiment has a number of advantages described below.

With the battery of the presently filed embodiment, sine the electrically conductive washers 100, 120, 130, 140 or 302 with the temporary insulators are used, it becomes possible to minimize the generation of useless voltage resulting from the unit cells being connected during fabrication for performing assembling work in a certain and reliable manner.

Further, since the electrically conductive washers 100 with the temporary insulators are enabled to permit easy removal of the temporary insulator means, it is suffice for assembling work to be conducted with no increase in the number of man-hour with minimal efforts. Also, since the electrically conductive washers 120, 130, 140, 302 with the temporary insulators are effective to automatically remove insulated conditions, no increase results in the number of man-hour on assembling work.

Furthermore, if the number of unit cells connected in series provides an output voltage of a value approximately less than 40 volts, the use of the electrically conductive washers with the insulation films in less number of pieces than the number of unit cells to be connected in series enables reduction in the number of man-hour on removing the insulation films.

Moreover, since the high friction sheet 3 is disposed between the unit cells 1' and between the unit cell 1' and the heat sink 2, no displacement occurs between the unit cells even in the presence of vibrations applied to the respective unit cells 1' and the heat sinks 2 that are stacked. Accordingly, even when applied to automobiles, it becomes possible to prevent the respective unit cells 1' and the heat sinks 2 from displacement or drop off resulting from vibrations.

Besides, no displacement or drop off occurs in the unit cells 1' as a result of vibrations, it is possible to avoid damages to the electrode tabs of the battery formed on the unit cells 1' connected in series or parallel.

Additionally, since no displacement occurs in the unit cells 1' due to the high friction sheets being interposed, no need arises in increasing a pressurizing force through which the stack of the unit cells 1' is pressurized from top and bottom thereof by the holding mechanism 4 for precluding displacement. Consequently, the unit cell 1' is not required to have an outer layer with an increased strength for withstanding a strong pressurizing force and the unit cell 1' can be formed in lightweight, resulting in reduction in light of the battery as a whole.

Further, the use of the high friction sheets 3 allows the unit cells 1' and the high friction sheets 3 to be alternately stacked when stacking the unit cells 1', enabling the battery to be easily manufactured.

Furthermore, since the high friction sheets 3 have non-adhesiveness with respect to the unit cells 1', the presence of failure in one of the unit cells 1' enables an arbitrary one of the unit cells 1' to be taken out for replacement.

Moreover, since the electrode tabs 12, 16 of the unit cells 1' have bores 13, 17 to allow the locating pin 52 to be inserted, inserting the locating pin 52 through the bores enables the unit cells 1' to be simply and reliably positioned with respect to one another.

Also, the projections 15 formed on the electrode tab 14 fit the holes of the other electrode tab 10, enabling the unit cells 1' to be simply and reliably positioned with respect to one another. Additionally, since fitting the projections 15 to the holes enables the unit cells 1' to be electrically connected to one another in a simple and reliable manner, no mistake occurs in a direction in which the unit cells 1' are overlapped during stacking work, making it possible to provide simplified assembling.

Additionally, since the holding mechanism 4 has both the pressurizing function and the cooling function, it becomes possible for heat, built up in the unit cells 1', to be radiated while applying the unit cells 1' with appropriate surface pressures.

Besides, the use of the pressurizing unit 40 mounted between the outer layer heat sinks 2a enables the outer layer heat sinks 2a to come close to one another to pressurize the unit cells 1' and the pressurizing mechanism can be incorporated in the inside of the battery, enabling miniaturization of the battery.

Further, since the unit cells 1' are stacked in the same direction as that in which the electric power generating elements are stacked, it becomes possible to obtain electric current in a stable manner.

Furthermore, since the unit cells 1' take the form of a flat type battery, the battery is able to have a reduced thickness.

Incidentally, while with the presently filed embodiment, the positive electrode tabs 10 of the unit cell 1a has the holes 11 and the negative electrode tabs 14 of the unit cell 1b has the projections 15, the presently filed embodiment is not limited to such a structure. The electrode tab in which the holes and projections are formed may have a reversed polarity. In addition, the electrode may be formed with concave portions in place of the holes 11 which the projections 15 fit.

Also, while with the presently filed embodiment, the electrode tabs extending from one sides of the unit cells 1' are connected through the fittings of the projections 15 and the holes 11, whereas the other sides of the unit cells 1' are connected through the insulation washers 51 and the electrically conductive washers 50, the presently filed embodiment is not limited to such a structure. Depending on circumstances, the both sides of the unit cells 1' may be connected through the fittings of the associated component parts or through insulation/electrically conductive washers. Or, ultrasonic welding may be employed to join the electrode tabs.

Further, while with the presently filed embodiment, there has been shown only one battery that is stacked in a vertical direction, the presently filed embodiment is not limited to such particular configuration and a plurality of batteries each formed of a stack of plural unit cells may be juxtaposed in electrical connection to provide a battery module with further increased power output. In such cases, bus bars may be mounted between the one of the batteries and the other one of the batteries to provide electrical connection. The bus bars may be mounted to and fixed to the locating pin 52 between the nut 53 and the electrically conductive washer 50.

Furthermore, although the presently filed embodiment has been described with reference to an exemplary structure wherein the electrode tabs on one side fit one another through concave and convex configurations, the electrode tabs on both sides may be stacked one above the other using the electrically conductive washers 50 and the insulation washers 51 to form separate stacks of unit cells that are connected in series. In such cases, the electrically conductive washers with temporary insulators may be employed not to cause the number of each of the separate stacks of unit cells connected in series to provide an output voltage exceeding a value of 40 volts.

Incidentally, with the presently filed embodiments set forth above, although the high friction sheets 3 are used as displacement preventive means, no limitation is intended by the presently filed embodiment. The displacement preventive means may be formed of sticky liquid applied to the unit cells or the heat sinks. Here, by the term "sticky liquid" is meant the material such as urethane family resin and rubber liquid. The employment of sticky liquid as the displacement preventive means allows sticky liquid to be merely applied onto surfaces of outer sheaths of the unit cells, enabling the battery to be simply manufactured.

Besides, the displacement preventive means may be formed by roughly machining the outer sheath surfaces of the unit cells in a coarse surface roughness. A method of increasing the surface roughness of the outer sheath surfaces of the unit cells includes a sandblasting method and laser peening method. Of course, grinding may be possibly employed using a sand paper. The use of a structure to allow the outer sheath surface of the unit cell to have coarse surface roughness allows the unit cells to be merely stacked in a sequence for thereby preventing these unit cells from displacement.

Further, while the high friction sheets 3 are formed of only silicone rubber, no limitation is intended by the presently filed embodiment. Examples of such material may include a base substrate, made of PET (polyethylene terephthalate), on which silicone rubber is located. Thus, the provision of the base substrate improves a rigidity of the high friction sheet, resulting in improved workability when setting these component elements on the heat sinks and the unit cell surfaces.

For such a base substrate being employed, the base substrate may be coated with adhesive to be adhered onto the unit cell or the heat sink. In such cases, a bare side of the high friction sheet 3 is adhered to the unit cell or the heat sink 2, but no adhesion occurs on the silicone rubber side. This enables the unit cells, stacked one above the other, or the unit cells and the heat sinks to be separated from one another.

The entire content of a Patent Application No. TOKUGAN 2003-351739 with a filing date of Oct. 10, 2003 in Japan and that of a Patent Application No. TOKUGAN 2003-351733 with a filing date of Oct. 10, 2003 in Japan are hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A battery comprising:
a plurality of unit cells stacked in a stack direction;
a plurality of conductive members each having an electric conductivity; and
a plurality of insulation members each having an electric insulation property, the plurality of conductive members and the plurality of insulation members being alternately disposed in the stack direction with the plurality of unit cells having respective output terminals being directly sandwiched respectively from both sides in the stack direction between at least one of the insulation members and at least one of the conductive members, wherein the plurality of unit cells are electrically connected in the stack direction; wherein the output terminals, insulation members, and conductive members are clamped together by a clamping force acting in the stack direction.

2. The battery according to claim 1, wherein the plurality of unit cells are flat in a direction perpendicular to the stack direction.

3. The battery according to claim 1, further comprising an insulator pin extending in the stack direction,
wherein the plurality of conductive members and the plurality of insulation members have insertion holes through which the insulator pin can be inserted, and the plurality of conductive members and the plurality of insulation members are alternately inserted around the insulator pin via the insertion holes with the respective output terminals of the plurality of unit cells being sandwiched.

4. The battery according to claim 3, wherein the output terminals of the plurality of unit cells include an electrode tab that extends in a direction perpendicular to the stack direction, and the insulator pin is inserted in an insertion hole of the electrode tab.

5. The battery according to claim 4, wherein the plurality of unit cells are stacked such that among the plurality of unit cells, the electrode tab of one unit cell is opposite in polarity to an electrode tab of another unit cell adjacent to the one unit cell in the stack direction,
and wherein the plurality of conductive members and the plurality of insulation members are alternately disposed in the stack direction with respective electrode tabs of the plurality of unit cells being sandwiched, wherein the plurality of unit cells are electrically connected in series.

6. The battery according to claim 3, wherein the plurality of unit cells include a plurality of pairs of unit cells, and respective pairs of unit cells of the plural pairs are connected in parallel through a parallel connection member while the insulator pin is inserted in an insertion hole of the parallel connection member.

7. The battery according to claim 1, further comprising a plurality of frame members by which the plurality of unit cells are positioned and held in place,
wherein the plurality of frame members are stacked in the stack direction to allow the plurality of unit cells to be stacked such that the plurality of conductive members and the plurality of insulation members are incorporated into the plurality of frame members.

8. The battery according to claim 1, further comprising voltage detection terminals connected to the plurality of conductive members and the plurality of insulation members.

9. The battery according to claim 1, further comprising a pressurizing mechanism pressurizing the plurality of unit cells in the stack direction.

10. The battery according to claim 1, further comprising a plurality of heat receiving and radiating members adapted to receive heat from the plurality of unit cells and radiate the heat, the plurality of heat receiving and radiating members being stacked in the stack direction.

11. The battery according to claim 1, further comprising a plurality of restricting members restricting the plurality of unit cells from displacing in a direction perpendicular to the stack direction, the plurality of restricting members being stacked in the stack direction.

12. The battery according to claim 1, wherein the plurality of conductive members and the plurality of insulation members include washer members.

13. The battery according to claim 12, wherein the washer members corresponding to the plurality of conductive members include insulation films that are detachable.

14. The battery according to claim 12, wherein the washer members corresponding to the plurality of conductive members include insulation members that are freely movable.

15. The battery according to claim 12, wherein the washer members corresponding to the plurality of conductive members include insulation members at least one of which is tearable.

16. The battery according to claim 12, wherein the washer members corresponding to the plurality of conductive members include insulation members that are deformable.

17. The battery according to claim 1, wherein the output terminals are of plate configuration.

18. The battery according to claim 1, wherein the output terminals are in respective abutting contact only on one side of a respective output terminal of the output terminals with the respective insulation members and conductive members between which the output terminals are sandwiched.

19. The battery of claim 1, further comprising a unit cell stack clamp, wherein the unit cell stack clamp includes a first compression element, a second compression element, and a connector connecting the first compression element and the second compression element, the first compression element being located on an opposite side of the stack of unit sells from the second compression element, the first and second compression elements acting with the connector to prevent the plurality of unit cells of the stack of unit sells from migrating apart in the stack direction.

20. The battery according to claim 1, wherein the conductive members are made of a material selected from the group consisting of copper and aluminum.

21. The battery according to claim 11, wherein the plurality of the restricting members are made of a friction sheet.

22. The battery according to claim 1, wherein the plurality of unit cells are electrically connected in the stack direction respectively through conductive members, and wherein respective insulation members are positioned directly above the respective conductive members with respect to the stack direction.

23. The battery according to claim 1, wherein the plurality of unit cells are electrically connected in the stack direction respectively through conductive members, and wherein respective insulation members are positioned directly above the respective conductive members with respect to the stack direction.

24. The battery according to claim 1, wherein the battery includes a substantially repetitive serpentine path for electrons to flow through the battery.

25. The battery according to claim 1, wherein the battery includes a substantially repetitive serpentine path for electrons to flow through the battery.

26. The battery according to claim 1, wherein the battery includes a substantially repetitive serpentine path for electrons to flow through the battery, the substantially repetitive serpentine path being substantially symmetric in a horizontal axis and being substantially symmetric in a vertical axis normal to the horizontal axis.

27. The battery according to claim 1, wherein the battery includes a substantially repetitive serpentine path for electrons to flow through the battery, the substantially repetitive serpentine path being substantially symmetric in a horizontal axis and being substantially symmetric in a vertical axis normal to the horizontal axis.

* * * * *